(12) United States Patent
Bostick et al.

(10) Patent No.: US 10,375,165 B2
(45) Date of Patent: Aug. 6, 2019

(54) REMOTE MANAGEMENT SYSTEM

(71) Applicant: Avago Technologies International Sales Pte. Limited, Singapore (SG)

(72) Inventors: Bill Bostick, Santa Ana, CA (US); Bill Daugherty, Fountain Valley, CA (US); Minh Bryant, Fountain Valley, CA (US); Alan Perelman, Huntington Beach, CA (US); Robert H. Nixon, Fountain Valley, CA (US); William Lasor, Mission Viejo, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 1327 days.

(21) Appl. No.: 14/158,313

(22) Filed: Jan. 17, 2014

(65) Prior Publication Data
US 2014/0222958 A1 Aug. 7, 2014

Related U.S. Application Data

(62) Division of application No. 10/277,922, filed on Oct. 21, 2002, now abandoned.

(51) Int. Cl.
| | |
|---|---|
| G06F 15/16 | (2006.01) |
| H04L 29/08 | (2006.01) |
| G06F 3/06 | (2006.01) |
| H04L 12/24 | (2006.01) |
| G06F 9/455 | (2018.01) |

(52) U.S. Cl.
CPC .......... H04L 67/1097 (2013.01); G06F 3/067 (2013.01); H04L 41/00 (2013.01); G06F 2009/45579 (2013.01); H04L 41/0213 (2013.01); H04L 41/046 (2013.01); H04L 41/22 (2013.01); H04L 67/34 (2013.01)

(58) Field of Classification Search
CPC .... H04L 67/1097; H04L 29/06; H04L 41/082
USPC ....................................................... 709/208
See application file for complete search history.

(56) References Cited

U.S. PATENT DOCUMENTS

| | | | | |
|---|---|---|---|---|
| 5,666,501 A * | 9/1997 | Jones | ........................ | G06F 8/61 709/222 |
| 5,765,156 A * | 6/1998 | Guzak | ..................... | G06F 9/543 707/756 |
| 6,775,830 B1 * | 8/2004 | Matsunami | ............... | G06F 8/61 717/174 |
| 6,941,429 B1 * | 9/2005 | Kamvysselis | ....... | G06F 11/1456 711/114 |
| 6,978,282 B1 * | 12/2005 | Dings | ................. | G06F 16/2308 707/610 |
| 2002/0083131 A1 * | 6/2002 | Machida | ............... | G06F 9/4411 709/203 |
| 2002/0111972 A1 * | 8/2002 | Lynch | ....................... | G06F 3/14 715/236 |
| 2003/0196007 A1 * | 10/2003 | Baron | ................... | G06F 9/4415 710/13 |

(Continued)

Primary Examiner — Oleg Survillo
(74) Attorney, Agent, or Firm — Sheridan Ross P.C.

(57) ABSTRACT

A system comprising a first host bus adapter coupled to a first Fiber Channel port and a remote manager associated with a second host bus adapter coupled to a second Fiber Channel port. The remote manager is operable to form a command to be sent by the second host bus adapter to the first host bus adapter via a Common Transport layer of a Fiber Channel.

19 Claims, 67 Drawing Sheets

(56) References Cited

U.S. PATENT DOCUMENTS

2003/0208581 A1\* 11/2003 Behren .................. H04L 41/12
709/223
2003/0217358 A1\* 11/2003 Thurston .................. G06F 8/60
717/174

\* cited by examiner

| Category | RMAPI Functions | FC_CT Commands |
|---|---|---|
| RMAPI Maintenance | RM Get Version<br>RM Load Library<br>RM Free Library | N/A |
| Discovery | RM Get Manageable HBAs List<br>RM Get Target Mapping | CT Query HBA<br>TBD |
| Server Attributes Maintenance | RM Get Server Attributes<br>RM Set Server Attributes | CT Get Server Attributes<br>CT Set Server Attributes |
| HBA Attributes Maintenance | RM Get HBA Attributes<br>RM Set HBA Attributes | CT Get HBA Attributes<br>CT Set HBA Attributes |
| Port Attributes Maintenance | RM Get Port Attributes<br>RM Set Port Attributes | CT Get Port Attributes<br>CT Set Port Attributes |
| Statistics Maintenance | RM Get Port Statistics<br>RM Reset Port Statistics | CT Get Port Statistics<br>CT Reset Port Statistics |

*FIG. 15A-1*

| Category | RMAPI Functions | FC_CT Commands |
|---|---|---|
| Device Action | RM Download Firmware<br>RM Upgrade Firmware<br>RM Reset HBA | CT Download Firmware<br>CT Upgrade Firmware<br>CT Reset HBA |
| Remote File Management | RM Get Remote Resource List<br>RM Get Remote Resource Info<br>RM Send Software Resource<br>RM Delete Remote Resource<br>RM Rename Remote Resource | CT Get Remote Resource List<br>CT Get Remote Resource Info<br>CT Send Software Resource<br>CT Delete Remote Resource<br>CT Rename Remote Resource |
| Driver Maintenance | RM Get Driver Attributes<br>RM Set Driver Attributes | CT Get Driver Attributes<br>CT Set Driver Attributes |
| Manage Persistent Bindings | RM Get All Nodes For Persistent Bindings<br>RM Add Persistent Binding<br>RM Delete Persistent Binding | |

FIG. 15A-2

| HBAAPI Function | RMAPI Equivalent |
|---|---|
| HBA_GetVersion () | RM_GetVersion () |
| HBA_LoadLibrary () | - Not Applicable - |
| HBA_FreeLibrary () | - Not Applicable - |
| HBA_GetNumberOfAdapters () | RM_GetManageableHbaList () |
| HBA_GetAdapterName () | - Not Applicable - |
| HBA_OpenAdapter () | - Not Applicable - |
| HBA_CloseAdapter () | - Not Applicable - |
| HBA_GetAdapterAttributes () | RM_GetHBAAttributes () |
| HBA_GetAdapterPortAttributes () | RM_GetPortAttributes () |
| HBA_GetPortStatistics () | RM_GetPortStatistics () |
| HBA_GetDiscoveredPortAttributes () | - Not Applicable - |
| HBA_GetPortAttributesByWWN () | RM_GetPortAttributes () |

*FIG. 15B-1*

| HBAAPI Function | RMAPI Equivalent |
|---|---|
| HBA_SendCTPassThru () | Useful as Diagnostic Tools. |
| HBA_GetEventBuffer () | |
| HBA_SetRNIDMgmtInfo () | |
| HBA_GetRNIDMgmtInfo () | |
| HBA_SendRNID () | |
| HBA_RefreshInformation () | - Not Applicable - |
| HBA_GetFcpTargetMapping () | RM_GetTargetMapping |
| HBA_GetFcpPersistentBinding () | |
| HBA_SendScsiInquiry () | - Not Applicable - |
| HBA_SendReportLUNs () | - Not Applicable - |
| HBA_SendReadCapacity () | - Not Applicable - |

FIG. 15B-2

| | |
|---|---|
| Server Name | Name of a Server on Which the Remote Management Agent (RMA) Software is Installed. |
| Firmware Resource Directory | The Name of a Directory on an RMA Server that is Used as a Repository for Firmware Image Files. |
| Driver Resource Pathname | The Name of a Directory on an RMA Server that is Used as a Repository for Driver Image Files. |

*FIG. 16A*

| Description | Size (bytes) | Attribute Type | Settable ? |
|---|---|---|---|
| Host Name | X-XXX | ASCII | N |
| Firmware Resource Pathname | X-XXX | ASCII | Y |
| Driver Resource Pathname | X-XXX | ASCII | Y |

*FIG. 16B*

| Description | Size (bytes) | Attribute Type | Settable ? |
|---|---|---|---|
| Manufacturer | x-xxx | ASCII | N |
| Serial Number | x-xxx | ASCII | N |
| Model | x-xxx | ASCII | N |
| Model Description | x-xxx | ASCII | N |
| Node WWN | x-xxx | Binary | N |
| Node Symbolic Name | x-xxx | ASCII | Y |
| Hardware Version | x-xxx | ASCII | N |
| Option ROM Version | x-xxx | ASCII | N |
| Firmware Version | x-xxx | ASCII | N |
| Vendor-Specific ID | x-xxx | Binary | N |
| Number of Ports | x-xxx | Binary | N |
| Driver Name | x-xxx | ASCII | N |
| Device ID | x-xxx | Binary | N |
| Operational Firmware Name | x-xxx | ASCII | N |

FIG. 17A-1

| Description | Size (bytes) | Attribute Type | Settable ? |
|---|---|---|---|
| SLI-1 Firmware Name | x-xxx | ASCII | N |
| SLI-2 Firmware Name | x-xxx | ASCII | N |
| IEEE Address | x-xxx | Binary | N |
| Boot BIOS State | x-xxx | Boolean | Y |
| Driver Version | x-xxx | ASCII | N |
| Platform Name | x-xxx | ASCII | N |
| Maximum CT Frame Size | x-xxx | Binary | N |
| OS Name and Version | x-xxx | ASCII | N |

*FIG. 17A-2*

| Description | Size (bytes) | Attribute Type | Settable ? |
|---|---|---|---|
| Host Name | X-XXX | ASCII | N |
| Manufacturer | X-XXX | ASCII | N |
| Serial Number | X-XXX | ASCII | N |
| Model | X-XXX | ASCII | N |
| Model Description | X-XXX | ASCII | N |
| Node WWN | X-XXX | Binary | N |
| Node Symbolic Name | X-XXX | ASCII | Y |
| Hardware Version | X-XXX | ASCII | N |
| Option ROM Version | X-XXX | ASCII | N |
| Firmware Version | X-XXX | ASCII | N |
| Vendor-Specific ID | X-XXX | Binary | N |
| Number of Ports | X-XXX | Binary | N |
| Driver Name | X-XXX | ASCII | N |
| Device ID | X-XXX | Binary | N |
| Emulex HBA Type Name | X-XXX | ASCII | N |

FIG. 17B-1

| Description | Size (bytes) | Attribute Type | Settable ? |
|---|---|---|---|
| Operational Firmware Name | x-xxx | ASCII | N |
| SLI-1 Firmware Name | x-xxx | ASCII | N |
| SLI-2 Firmware Name | x-xxx | ASCII | N |
| IEEE Address | x-xxx | Binary | N |
| Boot BIOS State | x-xxx | Boolean | Y |

*FIG. 17B-2*

| Description | Size (bytes) | Attribute Type | Settable ? |
|---|---|---|---|
| Node WWN | x-xxx | Binary | N |
| Port WWN | x-xxx | Binary | N |
| Port Symbolic Name | x-xxx | ASCII | Y |
| Port FcID | x-xxx | TBD | N |
| Port Type | x-xxx | Binary | N |
| Port State | x-xxx | Binary | N |
| Port Supported Class of Service | x-xxx | Binary | N |
| Port Supported Fc4 Types | x-xxx | Binary | N |
| Port Active Fc4 Types | x-xxx | Binary | N |
| Port Supported Speed | x-xxx | Binary | N |
| Port Speed | x-xxx | Binary | N |
| Port Max Frame Size | x-xxx | Binary | N |
| OS Device Name | x-xxx | ASCII | N |
| Number of Discovered Ports | x-xxx | Binary | N |
| Fabric Name | x-xxx | Binary | N |

FIG. 18

| Description | Size (bytes) | Attribute Type |
|---|---|---|
| Seconds Since Last Statistics Reset | X | Binary |
| Exchange Count (Originator) | X | Binary |
| Exchange Count (Responder) | X | Binary |
| Tx Sequence Count | X | Binary |
| Rx Sequence Count | X | Binary |
| Tx Frame Count | X | Binary |
| Rx Frame Count | X | Binary |
| Tx Word Count | X | Binary |
| Rx Word Count | X | Binary |
| Tx Kb Count | X | Binary |
| Rx Kb Count | X | Binary |
| LIP Count | X | Binary |
| NOS Count | X | Binary |
| Error Frame Count | X | Binary |
| Dumped Frame Count | X | Binary |
| Link Failure Count | X | Binary |

*FIG. 19A*

| Description | Size (bytes) | Attribute Type |
|---|---|---|
| Loss of Sync Count | X | Binary |
| Loss of Signal Count | X | Binary |
| Primitive Sequence Protocol Error Count | X | Binary |
| Invalid Tx Word Count | X | Binary |
| Invalid Rx Frame CRC Count | X | Binary |

*FIG. 19B*

| | |
|---|---|
| LUID | A Logical Unit Unique Device Identifier (LUID) is an Identification Descriptor with Association Value Zero (Device Association) and Identifier Type of Zero (Vendor Specific), One (T10 Vendor Identification), Two (EUI-64) or Three (Name_Identifier as Defined in FC-FS) from the Vital Products Data Device Identification Page (VPD Page 83h) Returned by the Logical Unit in Reply to a SCSI INQUIRY Command. The Identification Value for a LUID is a Bytestring Beginning in Byte 4 of the LUID and Continuing for the Length Specified in the Identifier Length Field of the LUID. A Logical Unit may have Zero or More Unique Device Identifiers, But No Two Logical Units may have the Same Unique Device Identifier. It is Strongly Encouraged to use Identifier Types of Two or Three, However Types Zero and One are Supported for Deployed Storage Devices that Only Export These Identifier Types. The RMAPI Supports LUIDs up to 256 Bytes Long. |
| NodeWWN | Refer to FC-MI Appendix A |
| PortWWN | Refer to FC-MI Appendix A |
| FcId | Refer to FC-MI Appendix A |
| FcpLun | Refer to FC-MI Appendix A |
| OSDeviceName | Refer to FC-MI Appendix A |
| ScsiBusNumber | Refer to FC-MI Appendix A |
| ScsiTargetNumber | Refer to FC-MI Appendix A |
| ScsiOSLun | Refer to FC-MI Appendix A |

*FIG. 20A*

| FCP Binding Type | Refer to FC-MI Appendix A |
|---|---|
| Scsiid | (OS Identification of Logical Units) Refer to FC-MI Appendix A |
| Fcpid | (FCP Identification of Logical Units) Refer to FC-MI Appendix A |
| Target Mapping | Refer to FC-MI Appendix A |
| Persistent Binding | Refer to FC-MI Appendix A |

*FIG. 20B*

| WWN | Refer to FC-MI Appendix A |
|---|---|
| Unittype | Refer to FC-MI Appendix A |
| PortID | Refer to FC-MI Appendix A |
| NumberOfAttachedNodes | Refer to FC-MI Appendix A |
| IPVersion | Refer to FC-MI Appendix A |
| UDPPort | Refer to FC-MI Appendix A |
| IPAddress | Refer to FC-MI Appendix A |

*FIG. 21*

| Field Name | Data Type | Word | Width | Bits |
|---|---|---|---|---|
| Resource Type | Bit Mask | 0 | 8 | 07:00 |
| Resource Sub-Type | Bit Mask | 0 | 24 | 31:08 |
| Reserved | | 1 | 8 | 07:00 |
| HBA Type | Bit Mask | 1 | 24 | 31:08 |

FIG. 23A

| Bit | Description |
|---|---|
| 0 | Firmware Image File |
| 1 | Driver File |
| 2-7 | Reserved |

FIG. 23B

| Bit | Description |
|---|---|
| 0 | AWC File |
| 1 | DWC File |
| 2 | PRG File |
| 3 | CFL File |
| 4-22 | Reserved |
| 23 | Other File Type |

FIG. 23C

| Bit | Description |
|---|---|
| 0-23 | Reserved |

FIG. 23D

| Bit | Description |
|---|---|
| 0 | LP 6000 |
| 1 | LP 7000 |
| 2 | LP 8000 |
| 3 | LP 850 |
| 4 | LP 9000 |
| 5 | LP 950 |
| 6 | LP 10000 |
| 7-22 | Reserved |
| 23 | Other HBA Type |

*FIG. 23E*

| FC-CT Command Name | Mnemonic |
|---|---|
| *(Get Attributes Commands)* | |
| Get Server Attributes | GSAT |
| Get HBA Attributes | GHAT |
| Get Port Attributes | GPAT |
| Get Driver Attributes | GDAT |
| Get Port Statistics | GPST |
| *(Set Attributes Commands)* | |
| Set Server Attributes | SSAT |
| Set HBA Attributes | SHAT |
| Set Port Attributes | SPAT |
| Set Driver Attributes | SDAT |
| *(HBA/Port Action Commands)* | |
| Reset Port Statistics | RPST |
| Verify Firmware | VFW |
| Download Firmware | DFW |
| Reset HBA | RES |
| Run HBA Diagnostic | RHD |
| Upgrade Firmware | UFW |
| *(Remote Resource Commands)* | |
| Get Remote Resource List | GRRL |
| Get Remote Resource Info | GRRI |
| Send Software Resource | SSR |
| Delete Remote Resource | DRR |
| Rename Remote Resource | RRR |
| *(Persistent Binding Commands)* | |
| Get Persistent Binding | |
| Add Persistent Binding | |
| Delete Persistent Binding | |

*FIG. 24A*

| FC-CT Command Name (Utility Management Commands) | Mnemonic |
|---|---|
| Query HBA | QHBA |
| Test Transmit and Receive | TEST |

*FIG. 24B*

| Item | Size (bytes) |
|---|---|
| Vendor_OUI | 4 |

*FIG. 25*

| Item | Size (bytes) |
|---|---|
| Vendor_OUI | 4 |
| Command Control Word | 4 |
| Command-Specific Parameter | 4 |
| Reserved | 4 |

*FIG. 26*

| Item | Size (bytes) |
|---|---|
| Vendor_OUI | 4 |
| Command Control Word | 4 |
| Command-Specific Parameter | 4 |
| Reserved | 4 |
| Port Identifier A | 8 |
| Port Identifier B | 8 |

*FIG. 27*

| Mnemonic | Description |
|---|---|
| INV_SRA | Invalid Software Resource Attribute |
| INV_SRD | Invalid Software Resource Descriptor |
| NO_RESOURCE | No Resource Found Matching SRD |
| PROTECTED | Software Resource Protected |
| INV_TAG | Invalid File Transfer Tag |
| INV_FRAG | Invalid Fragment Number |
| RSC_ATT_ERROR | Firmware Resource Attribute Invalid for HBA |
| RSC_TYPE_ERROR | Firmware Resource Internal Type Invalid for HBA |
| RSC_INT_FILE_ERROR | Firmware Resource Internal File Error |
| RSC_INT_CHK_ERROR | Firmware Resource Checksum Error |
| FLASH_NO_ROOM | No Room in Flash for Specified File |
| FLASH_ERROR | Flash HW Error |
| FW_DL_ERROR | Firmware Download Error; Other |

*FIG. 28A*

| Mnemonic | Description |
|---|---|
| MBX_ERR | The Mailbox Command Status was not SUCCESS |
| HW_ERROR_OBJECT | HW Error on Object HBA; Details not Specified |
| HW_ERROR_PROXY | HW Error on Proxy HBA; Details not Specified |
| ERROR_CLIENT | Unspecified Error Detected by Client |
| ERROR_SERVER | Unspecified Error Detected by Server |
| ERROR_OBJECT | Unspecified Error Detected by Server; Object HBA |
| ERROR_PROXY | Unspecified Error Detected by Server; Proxy HBA |

*FIG. 28B*

| FC-CT Command Name | Mnemonic | Reason Code Description |
|---|---|---|
| *(Get Attributes Commands)* | | |
| Get Server Attributes | | None |
| Get HBA Attributes | | None |
| Get Port Attributes | | None |
| Get Driver Attributes | | None |
| Get Port Statistics | | None |
| *(Set Attributes Commands)* | | |
| Set Server Attributes | | None |
| Set HBA Attributes | | None |
| Set Port Attributes | | None |
| Set Driver Attributes | | None |
| *(HBA/Port Action Commands)* | | |
| Reset Port Statistics | | None |
| Verify Firmware | NO_RESOURCE | No Resource Found Matching SRD |
| | RSC_ATT_ERROR | Firmware Resource Attribute Invalid |
| | RSC_TYPE_ERROR | Firmware Resource Internal Type Invalid |
| | RSC_INT_FILE_ERROR | Firmware Resource Internal File Error |
| | RSC_INT_CHK_ERROR | Firmware Resource Checksum Error |

*FIG. 29A*

| FC-CT Command Name | Mnemonic | Reason Code Description |
|---|---|---|
| Download Firmware | NO_RESOURCE | No Resource Found Matching SRD |
| | RSC_ATT_ERROR | Firmware Resource Attribute Invalid |
| | RSC_TYPE_ERROR | Firmware Resource Internal Type Invalid |
| | RSC_INT_FILE_ERROR | Firmware Resource Internal File Error |
| | RSC_INT_CHK_ERROR | Firmware Resource Checksum Error |
| | FLASH_NO_ROOM | No Room in Flash for Specified File |
| | FLASH_ERROR | Flash HW Error |
| | FW_DL_ERROR | Firmware Download Error; Other |
| | MBX_ERR | MBX Command Error |
| Reset HBA | MBX_ERR | MBX Command Error |
| | HW_ERROR_OBJECT | HW Error on Object HBA |
| Run HBA Diagnostic | MBX_ERR | MBX Command Error |
| | HW_ERROR_OBJECT | HW Error on Object HBA |
| *(Remote Resource Commands)* | | |
| Get Remote Resource List | INV_SRA | Invalid Software Resource Attribute |
| Get Remote Resource Info | INV_SRD | Invalid Software Resource Descriptor |
| Send Software Resource | INV_SRD | Invalid Software Resource Descriptor |
| | NO_RESOURCE | No Resource Found Matching SRD |

*FIG. 29B*

| FC-CT Command Name | Mnemonic | Reason Code Description |
|---|---|---|
| | INV_TAG | Invalid File Transfer Tag |
| | INV_FRAG | Invalid Fragment Number |
| | ERROR_CLIENT | Unspecified Error Detected by Client |
| | ERROR_SERVER | Unspecified Error Detected by Server |
| Delete Remote Resource | INV_SRD | Invalid Software Resource Descriptor |
| | NO_RESOURCE | No Resource Found Matching SRD |
| | PROTECTED | Software Resource Protected |
| | ERROR_SERVER | Unspecified Error Detected by Server |
| Rename Remote Resource | INV_SRD | Invalid Software Resource Descriptor |
| | NO_RESOURCE | No Resource Found Matching SRD |
| | PROTECTED | Software Resource Protected |
| | ERROR_SERVER | Unspecified Error Detected by Server |
| *(Persistent Binding Commands)* | | |
| Get Persistent Binding | | |
| Add Persistent Binding | | |
| Delete Persistent Binding | | |
| *(Utility Management Commands)* | | |
| Query HBA | | |

*FIG. 29C*

| Item | Size (bytes) |
|---|---|
| Additional Information Type | 2 |
| Additional Information Field Length | 2 |
| Data Field | 4-256 |

*FIG. 30*

| Item | Size (bytes) |
|---|---|
| Additional Information Type | 2 |
| Additional Information Field Length | 2 |
| Data Field | 4-256 |

*FIG. 31*

| Item | Size (bytes) |
|---|---|
| Port Statistic Entry Type | 2 |
| Port Statistic Entry Length | 2 |
| Port Statistic Entry Value | 4, 8 |

*FIG. 32*

| Item | Size (bytes) |
|---|---|
| Number of Port Statistic Entries | 4 |
| Port Statistic Entry 1 | x |
| Port Statistic Entry 2 | y |
| ... | ... |
| Port Statistic Entry n | z |

*FIG. 33*

| Item | Size (bytes) |
|---|---|
| SRD Type | X |
| SRD Length | X |
| Software Resource Attribute | X |
| Software Resource Version | XX |
| Software Resource Name | X-XXX |

*FIG. 34*

| Item | Size (bytes) |
|---|---|
| Number of SRDs | 4 |
| SRD 1 | x |
| SRD 2 | y |
| ... | ... |
| SRD n | z |

*FIG. 35*

| Item | Size (bytes) |
|---|---|
| Vendor_OUI | 4 |

*FIG. 36A*

| Item | Size (bytes) |
|---|---|
| Vendor_OUI | 4 |
| Server Attribute Block | Variable |

*FIG. 36B*

| Item | Size (bytes) |
|---|---|
| Vendor_OUI | 4 |
| Object HBA Identifier | 8 |
| Proxy HBA Identifier | 8 |

*FIG. 37A*

| Item | Size (bytes) |
|---|---|
| Vendor_OUI | 4 |
| HBA Attribute Block | Variable |

*FIG. 37B*

| Item | Size (bytes) |
|---|---|
| Vendor_OUI | 4 |
| Object Port Identifier | 8 |
| Proxy Port Identifier | 8 |

*FIG. 38A*

| Item | Size (bytes) |
|---|---|
| Vendor_OUI | 4 |
| Port Attribute Block | Variable |

*FIG. 38B*

| Item | Size (bytes) |
|---|---|
| Vendor_OUI | 4 |

*FIG. 39A*

| Item | Size (bytes) |
|---|---|
| Vendor_OUI | 4 |
| Driver Attribute Block | Variable |

*FIG. 39B*

| Item | Size (bytes) |
|---|---|
| Vendor_OUI | 4 |
| Object Port Identifier | 8 |
| Proxy Port Identifier | 8 |

*FIG. 40A*

| Item | Size (bytes) |
|---|---|
| Vendor_OUI | 4 |
| Port Statistics Block | Variable |

*FIG. 40B*

| Item | Size (bytes) |
|---|---|
| Vendor_OUI | 4 |
| Server Attributes Block | Variable |

*FIG. 41A*

| Item | Size (bytes) |
|---|---|
| Vendor_OUI | 4 |

*FIG. 41B*

| Item | Size (bytes) |
|---|---|
| Vendor_OUI | 4 |
| Reserved | 4 |
| Object HBA Identifier | 8 |
| Proxy HBA Identifier | 8 |
| HBA Attribute Block | Variable |

*FIG. 42A*

| Item | Size (bytes) |
|---|---|
| Vendor_OUI | 4 |

*FIG. 42B*

| Item | Size (bytes) |
|---|---|
| Vendor_OUI | 4 |
| Reserved | 4 |
| Object Port Identifier | 8 |
| Proxy Port Identifier | 8 |
| Port Attribute Block | Variable |

*FIG. 43A*

| Item | Size (bytes) |
|---|---|
| Vendor_OUI | 4 |

*FIG. 43B*

| Item | Size (bytes) |
|---|---|
| Vendor_OUI | 4 |
| Driver Attribute Block | Variable |

*FIG. 44A*

| Item | Size (bytes) |
|---|---|
| Vendor_OUI | 4 |

*FIG. 44B*

| Item | Size (bytes) |
|---|---|
| Vendor_OUI | 4 |
| Reserved | 4 |
| Object Port Identifier | 8 |
| Proxy Port Identifier | 8 |

*FIG. 45A*

| Item | Size (bytes) |
|---|---|
| Vendor_OUI | 4 |

*FIG. 45B*

| Item | Size (bytes) |
|---|---|
| Vendor_OUI | 4 |
| Reserved | 4 |
| Object HBA Identifier | 8 |
| Proxy HBA Identifier | 8 |
| Firmware Resource SRD | Variable |

*FIG. 46A*

| Item | Size (bytes) |
|---|---|
| Vendor_OUI | 4 |

*FIG. 46B*

| Item | Size (bytes) |
|---|---|
| Vendor_OUI | 4 |
| Command Control Word | 4 |
| Object HBA Identifier | 8 |
| Proxy HBA Identifier | 8 |
| Firmware Resource SRD | Variable |

*FIG. 47A*

| Item | Size (bytes) |
|---|---|
| Vendor_OUI | 4 |

*FIG. 47B*

| Item | Size (bytes) |
|---|---|
| Vendor_OUI | 4 |
| Command Control Word | 4 |
| Resource Server HBA Identifier | 8 |
| Object Server Object HBA Identifier | 8 |
| Object Server Proxy HBA Identifier | 8 |
| Firmware Resource SRD | Variable |

*FIG. 48A*

| Item | Size (bytes) |
|---|---|
| Vendor_OUI | 4 |

*FIG. 48B*

| Item | Size (bytes) |
|---|---|
| Vendor_OUI | 4 |
| Command Control Word | 4 |
| Object HBA Identifier | 8 |
| Proxy HBA Identifier | 8 |

*FIG. 49A*

| Item | Size (bytes) |
|---|---|
| Vendor_OUI | 4 |

*FIG. 49B*

| Field | Description |
|---|---|
| Word 1 | (Command Control Word) Reset Action |
|  | The Bits in this Field Indicate the Desired Reset Action. Exactly One Bit Must be Set. |
| Word 1 | (Command Control Word) Reset HBA Normal Mode |
|  | 1: Issue a Selective Reset to the Port, Followed by a RESTART MBX Command. |
| Word 1 | (Command Control Word) Reset HBA NoRAM Mode |
|  | 1: Issue a Selective Reset to the Port. No Subsequent MBX Command is Issued. |
| Word 1 | (Command Control Word) Reset HBA WarmStart Mode |
|  | 1: Issue a Selective Reset to the Port, Followed by a READ_REV MBX Command. |

FIG. 49C-1

| Field | Description |
|---|---|
| Word 1 | (Command Control Word) Reset Options |
|  | The Bits in this Field Specify Certain Reset Options. |
|  | Any Number of These Bits may be Set. |
| Word 1 | (Command Control Word) Skip POST |
|  | 1: This Bit is Applicable Only for a Normal Mode Reset Action. If Set, the Skip POST Bit in the RESTART MBX Command is Set. |
| Word 1 | (Command Control Word) Ignore Errors |
|  | 1: This Bit is Applicable Only for a Normal Mode Reset Action. If Set, the Ignore Errors Bit in the RESTART MBX Command is Set. |
| Word 1 | (Command Control Word) Re-Initialize Driver |
|  | 1: This Bit is Applicable Only for a Normal Mode Reset Action. If Set, After the Port Reset is Complete, the Driver will Re-Initialize the Port. |

*FIG. 49C-2*

| Item | Size (bytes) |
|---|---|
| Vendor_OUI | 4 |
| Command Control Word | 4 |
| Object HBA Identifier | 8 |
| Proxy HBA Identifier | 8 |

*FIG. 50A*

| Item | Size (bytes) |
|---|---|
| Vendor_OUI | 4 |

*FIG. 50B*

| Field | Bit (0) | Description |
|---|---|---|
| Word 1 | (Command Control Word) | TBD |

*FIG. 50C*

| Item | Size (bytes) |
|---|---|
| Vendor_OUI | 4 |
| Command Control Word | 4 |
| Software Resource Attribute | 8 |

*FIG. 51A*

| Item | Size (bytes) |
|---|---|
| Vendor_OUI | 4 |
| SRD List | Variable |

*FIG. 51B*

| Field | Description |
|---|---|
| Word 1 | Command Control Word |
| | Fields in the GRRL Command Control Word Control Which SRDs on the Server are Returned to the Client. |
| | If the Remote Server has Many Resources that Match the Software Resource Attribute, and/or if the Accept Buffer is Small, it is Possible that the List of SRDs will not Fit in the Accept Buffer. The Command Control Word Controls the Behavior in this Case. The Maximum/Residual Size Field in the Request/Accept are Implemented as Described in FC-GS-3. |
| Word 1 | (Command Control Word) Limit Response by Resource Type |
| | 0: No Software Resource Attribute Constraints are Placed on the Requested SRD List. |
| | 1: The Server will Return Only SRDs Matching Those Specified in the Resource Type Word. |

*FIG. 51C-1*

| Field | Description |
|---|---|
| Word 1 | (Command Control Word) Limit Response by Range |
| | 0: No Range Constraints are Placed on the Requested SRD List. |
| | 1: The Server will Return SRDs Beginning with the SRD Number Specified in the First SRD Field. |
| | This Specification does not Define how SRDs are Ordered by the Server. |
| Word 1 | (Command Control Word) Disallow Incomplete SRD |
| | 0: The Last SRD Returned may be Truncated if Necessary. |
| | 1: The Transfer will be Adjusted if Necessary so that the Last SRD is not Truncated. (The Potentially Truncated SRD will not be Transferred.) |
| Word 1 | (Command Control Word) Reserved |
| Word 1 | (Command Control Word) First SRD |
| | If the Limit Response By Range Bit is Set, this Field Specifies the First SRD to be Returned. |

*FIG. 51C-2*

| Field | Description |
|---|---|
| Word 2-3 | Software Resource Attribute |
| | This Field Contains Three Sub-Fields-Resource Type, Resource Sub-Type, and HBA Type - that Specify the Software Resource Attribute or Types that Shall be Returned. See Table 73 - Software Resource Attribute. |

*FIG. 51C-3*

| Item | Size (bytes) |
|---|---|
| Vendor_OUI | 4 |
| SRD | Variable |

FIG. 52A

| Item | Size (bytes) |
|---|---|
| Vendor_OUI | 4 |
| SRD | Variable |

FIG. 52B

| Item | Size (bytes) |
|---|---|
| Vendor_OUI | 4 |
| Command Control Word | 4 |
| File Transfer Tag/Fragment Number | 4 |
| Reserved | 4 |
| Client HBA Identifier | 8 |
| Server HBA Identifier | 8 |
| SSR Data Field | Variable |

FIG. 53A

| Item | Size (bytes) |
|---|---|
| Vendor_OUI | 4 |

FIG. 53B

| Field | | Description |
|---|---|---|
| Word 1 | | (Command Control Word) Resource Fragment |
| | | This Bit Indicates Whether the SSR Data Field Contains an SRD or a Resource Fragment. |
| | | 0: SRD |
| | | 1: Resource Fragment |
| Word 1 | | (Command Control Word) Last Fragment |
| | | This Bit Indicates Whether the Resource Fragment is the Last Fragment or not. |
| | | 0: Not Last Fragment |
| | | 1: Last Fragment |
| Word 2 | | File Transfer Tag |
| | | This Field Specifies a Unique Tag Which Identifies a Particular File Transfer Between a Particular Client/Server Pair. A Value of 0 is Invalid and Shall be Considered an Error. All SSR Requests Associated with a Particular File Transfer Between a Particular Client/Server Pair Shall have the Same File Transfer Tag. |

*FIG. 53C-1*

| Field | | Description |
|---|---|---|
| Word 2 | Fragment Number | |
| | | This Field Specifies the Fragment Number of the Software Resource Which is Carried in the SSR Data Field. If the Resource Fragment Bit = 0, the Fragment Number Field Must also be 0. If the Resource Fragment Bit = 1, the Fragment Number Field Must be Non-Zero. For the First Fragment, the Fragment Number Field Must be 1; then, for Subsequent Fragments, it Must be Continuously Incremented by One. |
| Words 3 | Reserved | |
| Words 4:5 | Client HBA Identifier | |
| | | This Field Contains the Client HBA Identifier; that is, the WWPN of the Transmitting HBA on the Sending System. |
| Words 6:7 | Server HBA Identifier | |
| | | This Field Contains the Server HBA Identifier; that is, the WWPN of the Receiving HBA on the Receiving System. |

*FIG. 53C-2*

| Item | Size (bytes) |
|---|---|
| Vendor_OUI | 4 |
| Command Control Word | 4 |
| SRD | Variable |

*FIG. 54A*

| Item | Size (bytes) |
|---|---|
| Vendor_OUI | 4 |

*FIG. 54B*

| Field | Description |
|---|---|
| Word 1 | (Command Control Word) Override Resource Protection |
| | 0: If this Bit is not Set, and the Remote Resource's Protection Attribute is Set, the Remote Resource will not be Deleted, and a Reject Response will be Returned. |
| | 1: If this Bit is Set, the Remote Resource will be Deleted, Even if its Protection Attribute is Set. |

*FIG. 54C*

| Item | Size (bytes) |
|---|---|
| Vendor_OUI | 4 |
| Command Control Word | 4 |
| Current Filename SRD | Variable |
| New Filename SRD | Variable |

*FIG. 55A*

| Item | Size (bytes) |
|---|---|
| Vendor_OUI | 4 |

*FIG. 55B*

| Field | | Description |
|---|---|---|
| Word 1 | | (Command Control Word) Override Resource Protection |
| | Bit (0) | 0: If this Bit is not Set, and the Remote Resource's Protection Attribute is Set, the Remote Resource will not be Renamed, and a Reject Response will be Returned. |
| | | 1: If this Bit is Set, the Remote Resource will be Renamed, Even if its Protection Attribute is Set. |

*FIG. 55C*

| Item | Size (bytes) |
|---|---|
| Vendor_OUI | 4 |
| Transmit Byte Count (Command) | 4 |
| Receive Byte Count (Response) | 4 |
| Test Command Reference Number | 4 |
| Data Field | Variable (X-XXXXXX) |

*FIG. 56A*

| Item | Size (bytes) |
|---|---|
| Vendor_OUI | 4 |
| Transmit Byte Count (Command) | 4 |
| Receive Byte Count (Response) | 4 |
| Test Command Reference Number | 4 |
| Data Field | Variable (X-XXXXXX) |

*FIG. 56B*

| Field | Description |
|---|---|
| Word 1 | (Status Word) Firmware Download In Progress |
| | 1: If this Bit is Set, the Firmware Download is in Progress. |
| Word 1 | (Status Word) HBA Reset In Progress |
| | 1: If this Bit is Set, the HBA Reset is in Progress. |
| Word 1 | (Status Word) Driver Initialization In Progress |
| | 1: If this Bit is Set, the Driver Initialization is in Progress. |
| Word 1 | (Status Word) Firmware Download Complete |
| | 1: If this Bit is Set, the Firmware Download is Complete. |
| Word 1 | (Status Word) HBA Reset Complete |
| | 1: If this Bit is Set, the HBA Reset is Complete. |

*FIG. 57A-1*

| Field | Description | |
|---|---|---|
| Word 1 | (Status Word) Driver Initialization Complete | |
| | 1: If this Bit is Set, the Driver Initialization is Complete. | |
| Word 1 | Progress Indicator | |
| | This Field Indicates the Degree of Progress of the Remote Immediate Mode Operation, in the Form of a Continuously Increasing Integer. | |

*FIG. 57A-2*

| Item | Size (bytes) |
|---|---|
| Vendor_OUI | 4 |

FIG. 57B

| Item | Size (bytes) |
|---|---|
| Vendor_OUI | 4 |
| Status | 4 |

FIG. 57C

REMOTE MANAGEMENT SYSTEM

CLAIM OF PRIORITY

This application is a divisional of U.S. patent application Ser. No. 10/277,922, which was filed on Oct. 21, 2002. The above identified application is hereby incorporated herein by reference in its entirety.

BACKGROUND

A Storage Area Network (SAN) may comprise a plurality of servers, storage devices and switches. Each server may have a host bus adapter (also called an "HBA" or "adapter") that couples the server to the network. HBAs installed throughout the SAN may require configuration and maintenance operations. These operations have conventionally been performed on each node of the SAN independently. As SANs become larger and more complex, the number of host servers and adapters on a given SAN may increase and their locations may be physically diverse. Large, complex SANs can be expensive and time-consuming to install and maintain. A SAN administrator's job of managing multiple servers, HBAs, ports (access points of devices to a network), switches, and storage arrays may be more demanding. For example, the SAN administrator must update HBA firmware locally at each host server where the HBA is installed.

SUMMARY

One aspect of the invention relates to a remote management system that allows an administrator at a designated location to manage a plurality of servers, HBAs (e.g., Fibre Channel and/or iSCSI) and ports of a storage area network (SAN). The remote management system may comprise a remote management client (RMC) software at a remote manager server and a remote management agent (RMA) software at each target server and/or HBA to be managed.

The remote management system may remotely query for status information, monitor server, HBA and port activity, diagnose problems and set configurations, settings, options and parameters of servers, HBAs and ports of the SAN.

The remote management system may provide a number of advantages. The remote management system may greatly simplify a SAN administrator's job because the administrator does not have to manage each HBA locally at the host server where the HBA is installed. By providing a centralized point of HBA management, the remote management system may advantageously reduce the cost of owning and managing a SAN and its components.

The remote management system may initiate a transfer of new HBA firmware (also called "firmware update") to any HBA in the SAN. The remote management system may update HBA firmware in real-time and without affecting the SAN performance.

The remote management system may distribute drivers and/or driver updates to remote servers.

The remote management system may communicate with and control HBAs by using an "in-band" (on the SAN) communication network, such as Fibre Channel Common Transport (FC-CT) packets over a Fibre Channel network or Internet Protocol (IP) packets over an iSCSI network.

In addition to or instead of "in-band" communication, the remote management system may use "out-of-band" communication, such as Internet Protocol (IP) packets over an Ethernet, to communicate with and control HBAs on the same SAN or a separate SAN. Out-of-band communication between the remote manager and an HBA may be over a network other than the SAN. Out-of-band communication will enable the system to manage HBAs on multiple SANs, which may not be directly networked with each other.

The remote management client may have a user interface application that accesses a robust, high-level remote management application program interface (RMAPI). The RMAPI may be distributed to independent software vendors (ISVs) to develop their own management applications and user interfaces. The RMAPI provides ISV applications access to the features of the remote management system.

The RMAPI may be consistent across a plurality of platforms and operating systems, such as Windows NT/2000, Solaris, AIX, HP-UX and Linux. The RMAPI may be completely generic such that both Fibre Channel adapters and iSCSI adapters may be managed using the same API.

The RMAPI may access functions in a library for Fibre Channel HBAs (FC-RMAPI) and a library for iSCSI HBAs (ISCI-RMAPI). The FC-RMAPI library may comprise FC RMAPI (RM) commands, which correspond to FC Common Transport (CT) commands, which may be sent across the fabric with Input-Output Control (IOCTL) functions.

Another benefit of the remote management system may be realized as SAN switches continue to evolve into intelligent computers. Switches and other fabric devices may be able to access driver-level Input-Output Control (IOCTL) functions via an IOCTL interface to remotely manage HBAs. For example, switches and other fabric devices may remotely change HBA firmware configurations and options.

The remote management system may provide eXtensible Markup Language (XML) support.

The remote management system may provide a management tool in the form of a Microsoft Management Console (MMC) snap-in.

One embodiment of the remote management system will not interfere with any third-party software product and will not require any changes to any operating system or application. In-band remote control may be transparent to all hardware devices of the SAN.

One aspect of the application relates to a system with a Fibre Channel network. The system comprises a first host bus adapter coupled to a first port of the Fibre Channel network; and a remote manager associated with a second host bus adapter coupled to a second port of the Fibre Channel network. The remote manager is operable to send a command from the second host bus adapter to the first host bus adapter via a Common Transport layer of the Fibre Channel network.

Another aspect relates to a program interface module at a first computer. The program interface module is operable to allow a client software application to access a library of remote management functions. Each remote management function is associated with a Fibre Channel Common Transport command. Each Fibre Channel Common Transport command is configured to command a component of a second computer to perform a function. The second computer is in communication with the first computer via a Fibre Channel network.

Another aspect relates to a system with an Internet Small Computer System Interface (iSCSI) network. The system comprises a first host bus adapter coupled to a first port of the iSCSI network; and a remote manager associated with a second host bus adapter coupled to a second port of the iSCSI network. The remote manager is operable to send a command from the second host bus adapter to the first host bus adapter in Internet Protocol packets via the iSCSI network.

Another aspect relates to a data structure comprising an attribute type field, an attribute length field, and an attribute datum field. The data structure describes an attribute of a component in a storage area network, the attribute data structure being configured to be transmitted from a first node to a second node of a Fibre Channel network via a Fibre Channel Common Transport layer.

Another aspect relates to a Fibre Channel Common Transport command configured to be sent from a first Fibre Channel port to a second Fibre Channel port. The Fibre Channel Common Transport command instructs a component in communication with the second Fibre Channel port to perform a function.

Another aspect relates to a command structure configured to be sent from a first computer at a first Fibre Channel port to a second computer at a second Fibre Channel port. The command structure comprises an object port address that specifies where the command is to be sent; a proxy port address that specifies a backup address where the command is to be sent; a pointer; and a return value.

Another aspect relates to a repository comprising a disk-based directory. The repository is operable to store a file to be transferred from a first computer server to a computer second server via a plurality of Fibre Channel Command Transport packets.

Another aspect relates to a repository comprising a disk-based directory at a second computer. The repository is operable to store a file transferred from a first computer to the second computer via a plurality of Fibre Channel Command Transport packets.

Another aspect relates to a software module operable to communicate with a host bus adapter driver on a server. The software module comprises a plurality of remote command modules operable to receive commands from remote ports of a storage area network; a kernel operable to dispatch the commands received from the remote command modules to a plurality of protocol managers; and a plurality of management service modules operable to execute the commands.

Another aspect relates to a method of sending a command to a device in a Fibre Channel network. The method comprises receiving a user command at a first device in the Fibre Channel network; accessing a Fibre Channel Common Transport command library to identify a Fibre Channel Common Transport command that corresponds to the user command; encapsulating the Fibre Channel Common Transport command in a Common Transport Information Unit Request; sending the Common Transport Information Unit Request to a second device via the Fibre Channel network.

Another aspect relates to a method of sending a command to a device in a Internet Small Computer Interface (iSCSI) network. The method comprises receiving a user command at a first device in the iSCSI network; accessing a iSCSI command library to identify an iSCSI command that corresponds to the user command; and sending the iSCSI command to a second device via the iSCSI network.

Another aspect relates to a method of transferring a firmware file to a remote host bus adapter. The method comprises importing a firmware file to a local repository; verifying that the firmware file is compatible with the remote adapter that is to receive the firmware file; and sending the firmware file to the remote host adapter via a Fibre Channel Common Transport (FC-CT) layer.

The details of one or more embodiments are set forth in the accompanying drawings and the description below.

Other features, objects, and advantages will be apparent from the description and drawings, and from the claims.

BRIEF DESCRIPTION OF DRAWINGS

FIGS. 15A-1 and 15A-2 illustrate one embodiment of major RMAPI function categories, individual RMAPI functions and their associated FC-CT commands.

FIGS. 15B-1 and 15B-2 illustrate examples of HBAAPI functions and RMAPI functions.

FIGS. 16A-16B illustrate examples of server attributes and their formats.

FIGS. 17A-1, 17A-2, 17B-1, and 17B-2 illustrate examples of HBA attributes and their formats.

FIG. 18 illustrates examples of port attributes and their formats.

FIGS. 19A-19B illustrate examples of port statistics and their formats.

FIGS. 20A-20B illustrate examples of port FCP attributes.

FIG. 21 illustrates examples of FC-3 management attributes.

FIGS. 23A-23E illustrate one embodiment of a software resource attribute and its fields.

FIGS. 24A-24B illustrate examples of vendor-unique FC-CT command codes.

FIGS. 25-27 illustrate examples of Common Transport (CT) Command Block formats.

FIGS. 28A-28B list examples of CT Vendor-Unique Reject Reason Codes.

FIGS. 29A-29C list examples of CT vendor-unique reason codes for command-specific errors.

FIG. 30 illustrates one embodiment of a CT Reject Additional Information field.

FIG. 31 illustrates one embodiment of a Reject CT_IU Additional Information field.

FIG. 32 illustrates one embodiment of a general format that may be used for all port statistics.

FIG. 33 illustrates one embodiment of a Port Statistics Block entry.

FIG. 34 illustrates one embodiment of a Software Resource Descriptor (SRD).

FIG. 35 illustrates one embodiment of a Software Resource Block (SRB).

FIGS. 36A-36B illustrate examples of a Get Server Attributes Command and a Get Server Attributes Response.

FIGS. 37A-37B illustrate examples of a Get HBA Attributes Command and a Get HBA Attributes Response.

FIGS. 38A-38B illustrate examples of a Get Port Attributes Command and a Get Port Attributes Response.

FIGS. 39A-39B illustrate examples of a Get Driver Attributes Command and a Get Driver Attributes Response.

FIGS. 40A-40B illustrate examples of a Get Port Statistics Command and a Get Port Statistics Response.

FIGS. 41A-41B illustrate examples of a Set Server Attributes Command and a Set Server Attributes Response.

FIGS. 42A-42B illustrate examples of a Set HBA Attributes Command and a Set HBA Attributes Response.

FIGS. 43A-43B illustrate examples of a Set Port Attributes Command and a Set Port Attributes Response.

FIGS. 44A-44B illustrate examples of a Set Driver Attributes Command and a Set Driver Attributes Response.

FIGS. 45A-45B illustrate examples of a Reset Port Statistics Command and a Reset Port Statistics Response.

FIGS. 46A-46B illustrate examples of a Verify Firmware Command and a Verify Firmware Response.

FIGS. 47A-47B illustrate examples of a Download Firmware Command and a Download Firmware Response.

FIGS. 48A-48B illustrate examples of an Upgrade Firmware Command and an Upgrade Firmware Response.

FIGS. 49A, 49B, 49C-1, and 49C-2 illustrate examples of a Reset HBA Command, a Reset HBA Response and Reset HBA Command details.

FIGS. 50A-50C illustrate examples of a Run HBA Diagnostic Command, a Run HBA Diagnostic Response and Run HBA Diagnostic command details.

FIGS. 51A, 51B, 51C-1, 51C-2, and 51C-3 illustrate examples of a Get Remote Resource List Command, a Get Remote Resource List Response and Get Remote Resource List command details.

FIGS. 52A-52B illustrate examples of a Get Remote Resource Info Command and a Get Remote Resource Info Response.

FIGS. 53A, 53B, 53C-1, and 53C-2 illustrate examples of a Send Software Resource Command, a Send Software Resource Response and Send Software Resource Command Details.

FIGS. 54A-54C illustrate examples of a Delete Remote Resource Command, a Delete Remote Resource Response and Delete Remote Resource Command Details.

FIGS. 55A-55C illustrate examples of a Rename Remote Resource Command, a Rename Remote Resource Response and Rename Remote Resource Command Details.

FIGS. 56A and 56B illustrate examples of a Test Transmit and Receive Command and a Test Transmit and Receive Response.

FIGS. 57A-1, 57A-2, 57B, and 57C illustrate examples of Query HBA Response details, a Query HBA Command and a Query HBA Response.

Like reference symbols in the various drawings indicate like elements.

DETAILED DESCRIPTION

Figure 1:
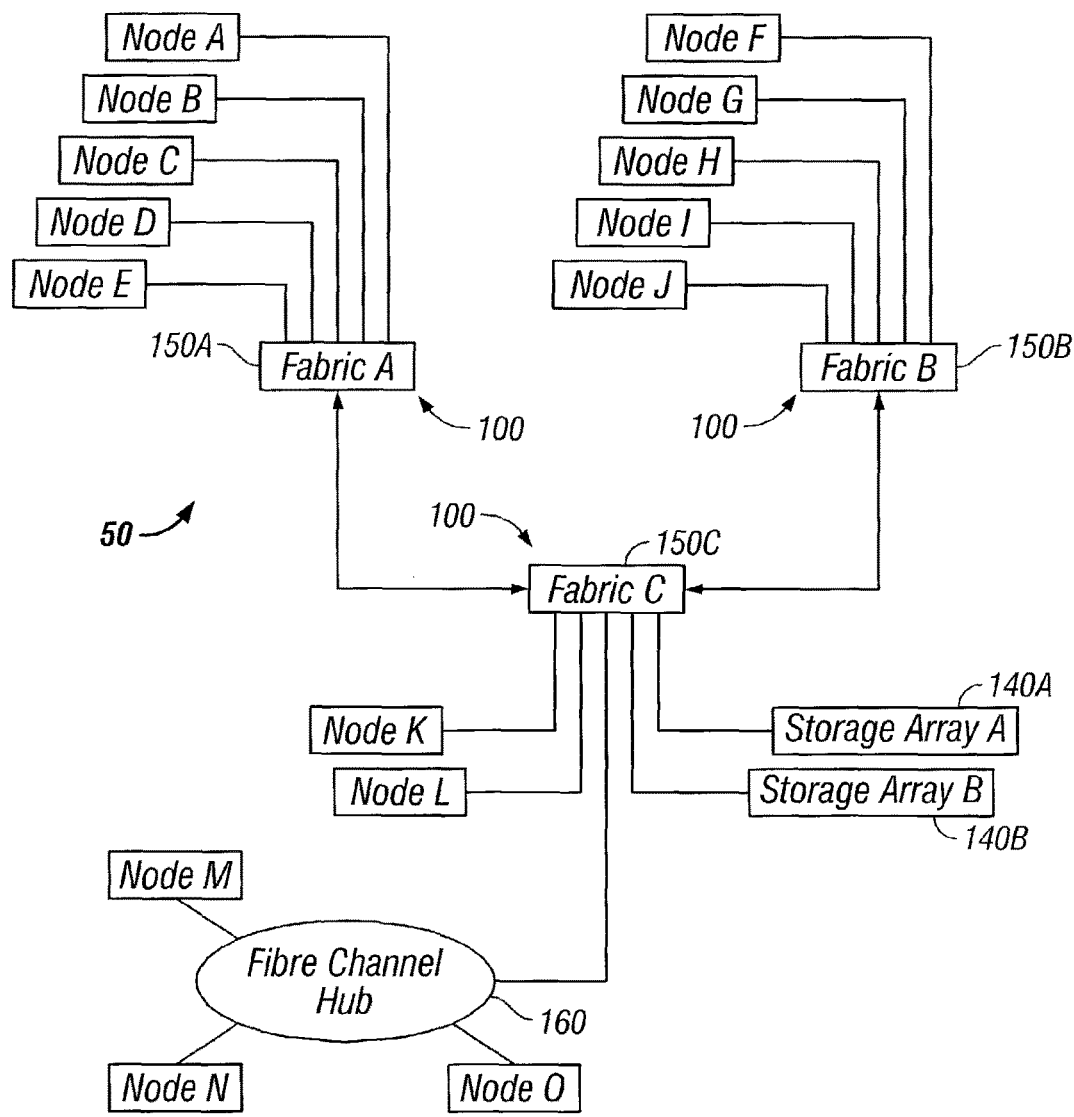
FIG. 1 illustrates one embodiment of a storage area network (SAN).

FIG. 1 illustrates one embodiment of a storage area network (SAN) 50. An enterprise SAN 50 is commonly a large and complex network that may include hundreds of nodes, such as nodes A-O in FIG. 1. The nodes A-O of the SAN 50 may be coupled to each other with fabric devices 150A-150C (e.g., Fibre Channel (FC) switches) and one or more FC hubs 160. The terms "fabric" and "switch" may be used synonymously herein. In a discussion of Fibre Channel devices, the term "switch" implies a "fabric device," such as a switch manufactured by Brocade or McData. These switches are not to be confused with an "IP switch" or "router device" such as one manufactured by Cisco. A Fibre Channel fabric device is an integral component of a SAN 50. An IP switch or router may exist on a separate Ethernet network, but is not a functional component of a Fibre Channel SAN.

The SAN 50 may use a Fibre Channel or iSCSI network. Other types of networks may be implemented. The description below may use the Fibre Channel as a primary example.

Nodes A-O in the SAN 50 may comprise storage arrays 140A, 140B or computer systems/servers with installed Fibre Channel or iSCSI HBAs 112A-112C (FIG. 2A) that connect to fabric devices 150A-C. Other embodiments of the SAN 50 may have other components in addition to or instead of the components in FIG. 1, such as additional nodes, storage devices and fabric devices.

Servers and HBAs

Figure 2A:
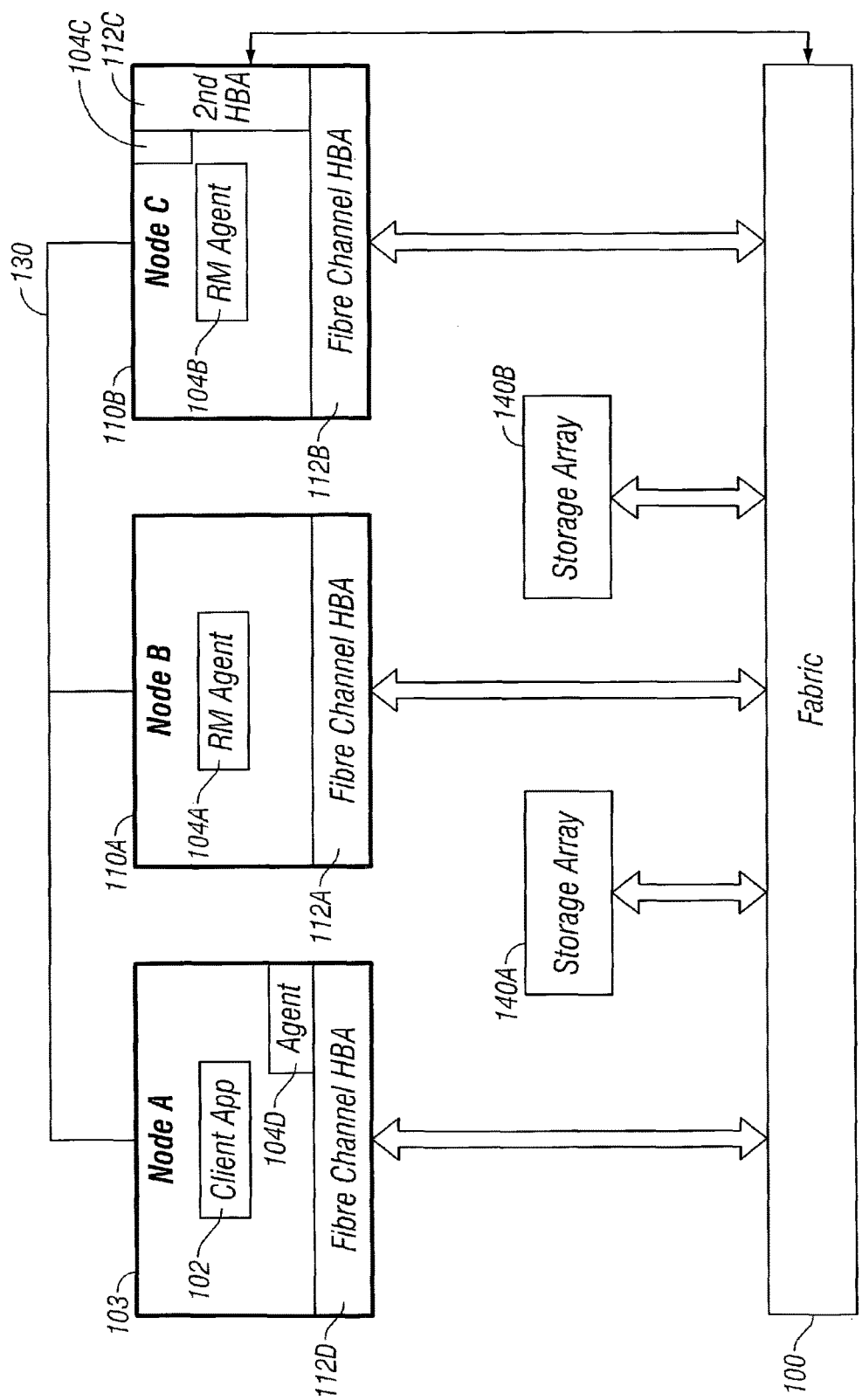
FIGS. 2A-2B illustrate one embodiment of a remote management client (RMC) and one or more remote management agents (RMAs) in the SAN of FIG. 1.

FIG. 2A illustrates a remote manager computer/server 103, one or more host/target servers or computer systems 110A, 110B and storage arrays 140A, 140B coupled to ports of the fabric 100. The fabric 100 may be coupled to one or more switches, hubs and/or routers. In FIG. 2A, host servers 110A, 110B communicate with the fabric 100 via host bus adapters (HBAs) 112A, 112B, 112C, such as Fibre Channel HBAs and iSCSI HBAs made by Emulex Corporation of Costa Mesa, Calif. The HBAs 112A-112C are operable to execute remote management agent (RMA) software 104A, 104B, and 104C.

Each host server 110 may have more than one HBA. For example, host server 110B may have a target/object HBA 112B (intended target of a Common Transport (CT) management request) and a proxy HBA 112C. In situations where the object HBA 112B is not available, a CT Request may be sent to the proxy HBA 112C on the same server 110B.

Each HBA 112 (FIG. 2A) installed on nodes A-O throughout the SAN 50 may require configuration and maintenance operations.

Figure 2B:
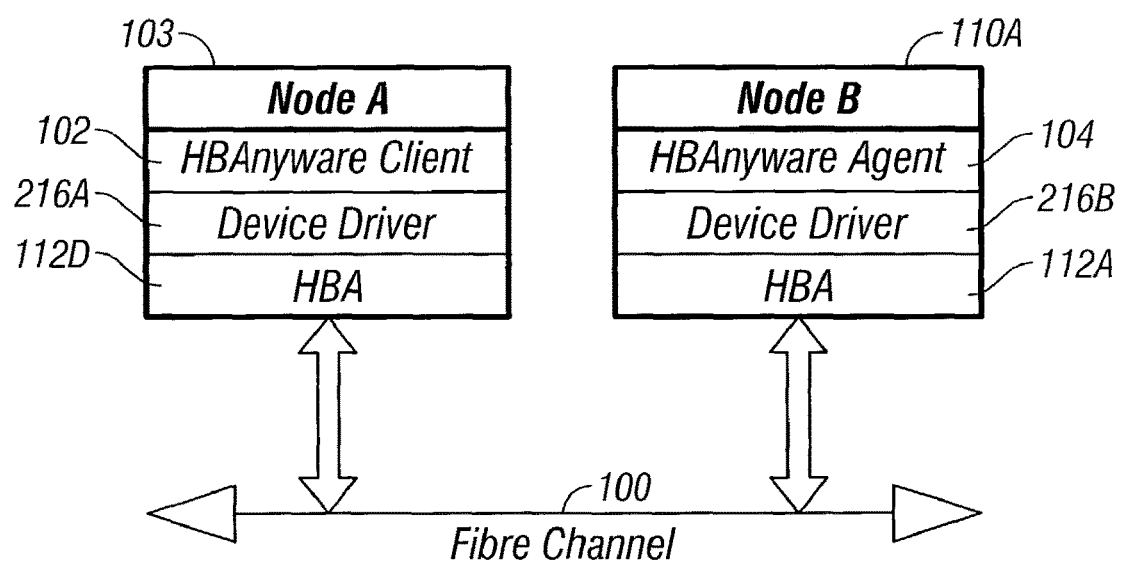

FIGS. 2A-2B illustrate one embodiment of a remote management client (RMC) 102 and one or more remote management agents (RMAs) 104A, 104B in the SAN 50 of FIG. 1. The RMC 102 and RMAs 104 are collections of software components that allow a single point (server 103) in the SAN 50 to manage HBAs and other components. This single point of management (server 103) executes the RMC application 102, which provides management functions.

Other nodes with installed HBAs 112A, 112B, 112C run RMA applications 104A, 104B, 104C, which respond to management requests from the RMC application 102. The RMC application 102 may issue RMC management commands to remote HBAs 112A, 112B over the Fibre Channel fabric 100.

In FIG. 2B, the RMC application 102 places a command on the Fibre Channel fabric 100 via an interface provided by a device driver 216A. When the remote node B receives the command, the device driver 216B on the remote node B passes the command to the RMA 104.

The RMC 102 and RMA 104 together may be referred to as a remote management utility (RMU). The RMC 102 and RMA 104 may form a client/server architectural model.

Remote Manager

In FIG. 2A, the remote manager computer/server 103 may have an HBA 112D, an RMC 102 and an RMA 104D. The remote manager 103 may be a computer server like the host servers 110A, 110B. In fact, any server 110 in the SAN 50 may load and execute a RMC software 102 and operate as a remote manager 103.

The RMC 102 may have an application 302 with a graphical user interface (GUI) (FIGS. 3A-3B and FIGS. 6-14) for an administrator to monitor local and remote HBAs 112D, 112A, 112B, 112C and issue commands. For example, the remote manager 103 may transfer/copy new HBA firmware versions or updates to any or all HBAs 112D, 112A, 112B, 112C in the same SAN 50.

The remote management client 102 and/or agent 104 may be user-installed. A bundled remote management package, including the appropriate driver, may be made available for download on the Emulex web site for Emulex's customers. The remote management components may include an install process, which will install an HBA driver and all required remote manager software, and a "readme" file describing the install process and operational functionality. The HBA driver 216 may be installed separately from the "HBAnyware" client 102 and agent 104.

Remote Management Client (RMC)

The remote management client (RMC) 102 comprises a set of software components that may provide remote management of both Fibre Channel and/or iSCSI HBAs. The RMC 102 may reside on any machine or system with a Fibre Channel or iSCSI HBA.

Figure 3A:
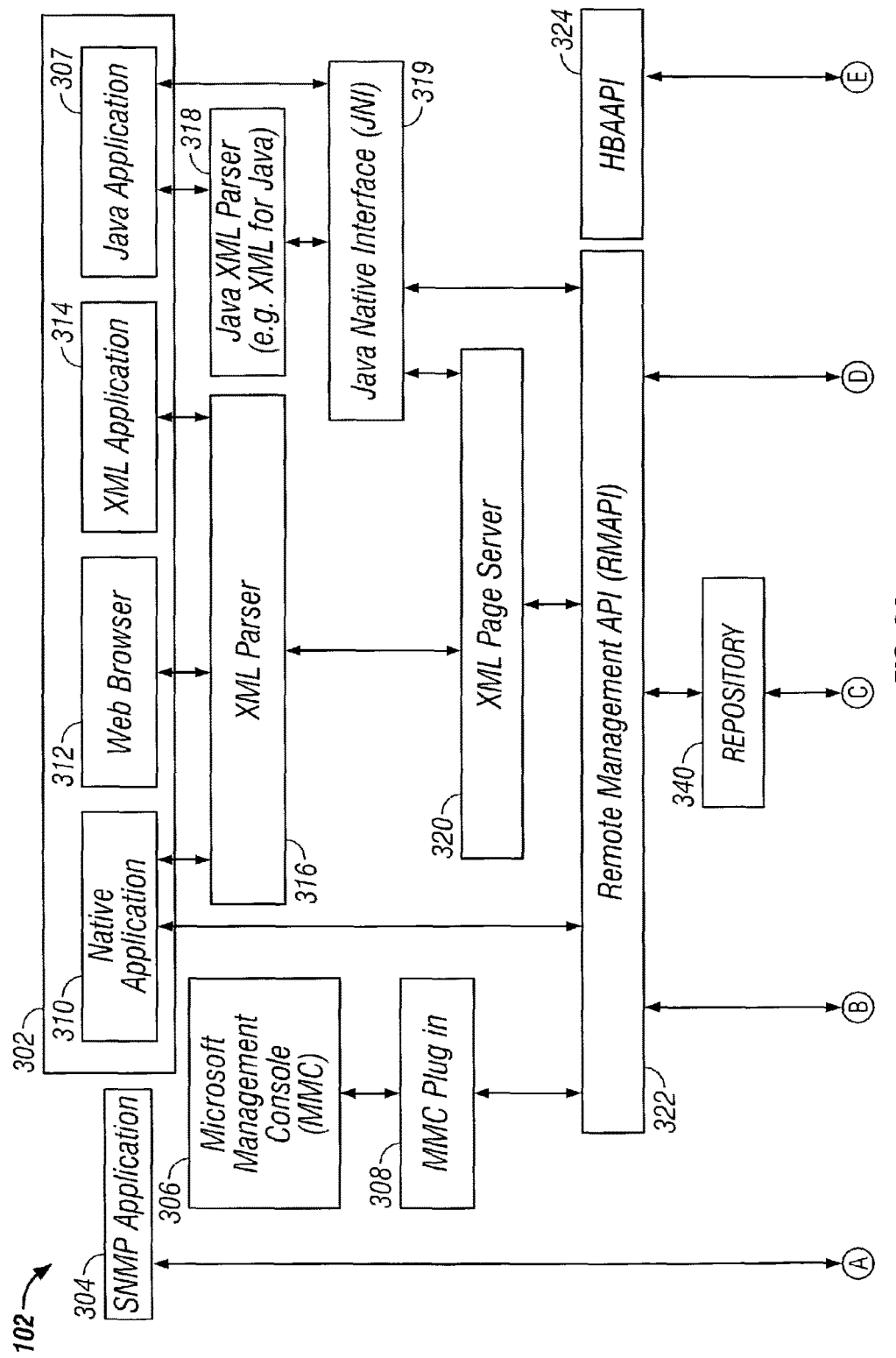
FIGS. 3A-3B illustrate one embodiment of the RMC in FIGS. 1 and 2.
Figure 3B:
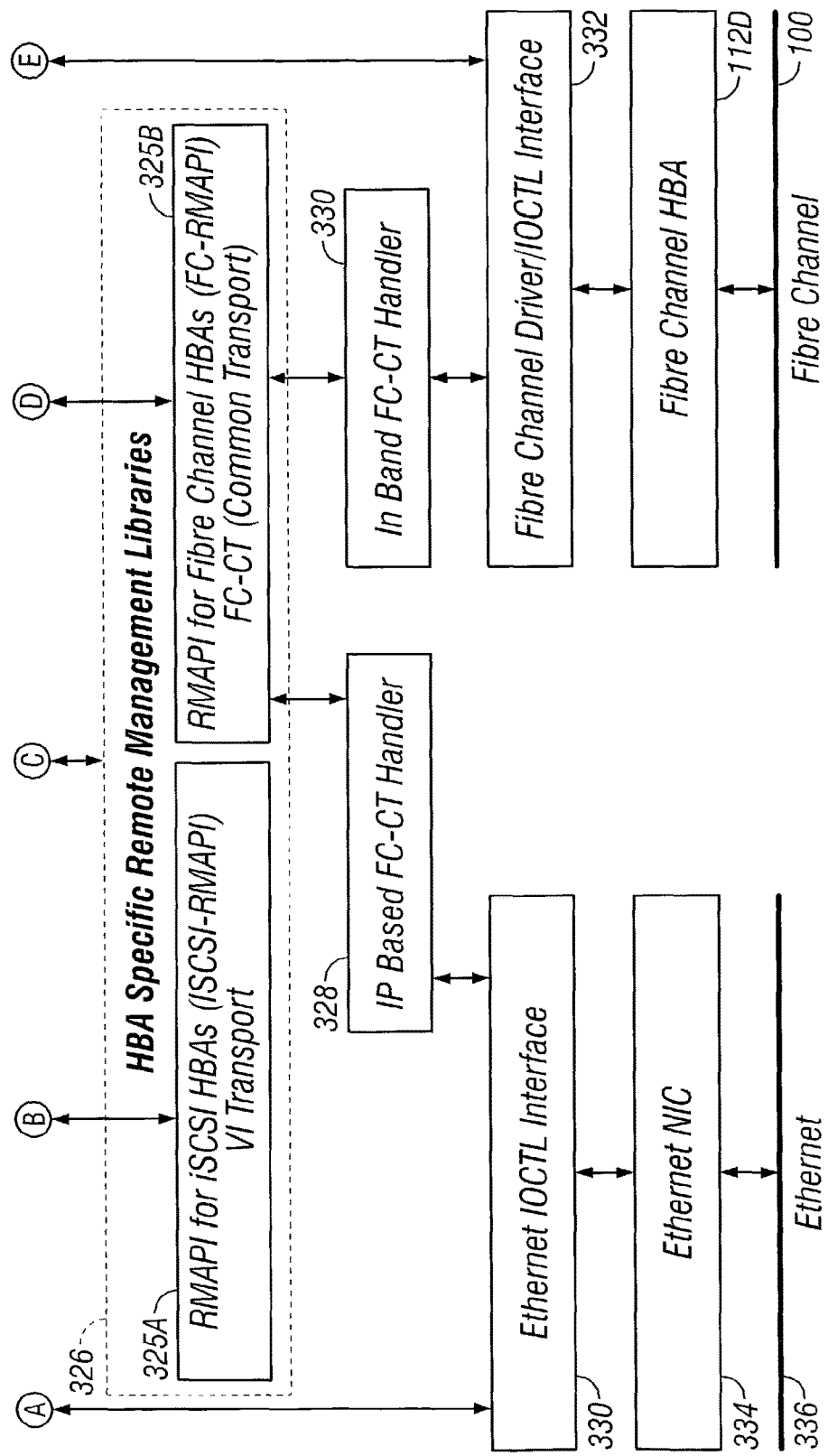

FIGS. 3A-3B illustrate one embodiment of the remote management client 102 in FIGS. 1, 2A and 2B and other related software, such as a web browser 312, a Microsoft management console (MMC) 306, a Java native interface (JNI) 319 and an Ethernet network interface card (NIC) 334. The remote management client 102 in FIGS. 3A-3B may comprise some or all of the following: a Simple Network Management Protocol (SNMP) application 304, a native application 310, an XML application 314, a Java application 307, an MMC plug-in 308, an XML parser 316, an XML page server 320, a Java XML parser 318, a remote management application program interface (RMAPI) 304, an HBAAPI 324, one or more HBA-specific remote management libraries 306, an IP-based FC-CT handler 328, an Ethernet IOCTL interface 330, an in-band FC-CT handler 308 and an FC driver/IOCTL interface 332. The HBA-specific remote management libraries 306 may comprise a RMAPI for FC HBAs 325B and/or a RMAPI for iSCSI HBAs 325A.

Other embodiments of the remote management client 102 may comprise less than all of the components in FIGS. 3A-3B. Other embodiments of the RMC 102 may comprise other components in addition to or instead of the components shown in FIGS. 3A-3B.

The RMC 102 (also called "client 102") may enable top-level applications 304, 310, 312, 314, 307 to access functions in the remote management libraries 326 from a console command prompt. The client 102 may be intended for use in scripted operations from within shell scripts, batch files or the specific platform equivalent.

For example, a Command Line Interface (CLI) client is a "console application," which has a text interface, as opposed to a Graphical User Interface (GUI). In one embodiment, three client applications are delivered with an HBAnyware client 102: a Windows GUI application, a Java GUI application, and a CLI application called HBACMD. A first parameter to a CLI client command may be a requested operation. Upon completion of the specified operation, the user at the remote manager 103 may be returned to the command prompt. Some operations described below may retrieve information about an entity on the SAN 50, and display that information on the manager console 103 (see FIGS. 6-14).

CLI client commands may have one or more additional parameters that specify the nature of the command. A parameter used by many HBACMD commands specifies the World Wide Node Name of the HBA that is the target of the command. For example, the command:

C:\>HBACMD PORTATTRIB 10:00:00:00:c9:20:20:20 will display port attributes for the HBA with the specified World Wide Node Name (WWNN).

Remote Management API (RMAPI)

Third party independent software developers/vendors (ISV), such as Veritas, may write their own management applications, represented by one of the top-level applications 304, 310, 312, 314, 307, to access the externally visible RMAPI 322. The RMAPI 322 provides an interface to manage local and remote host bus adapters 112A-112D (FIG. 2A). Even though the RMAPI 322 is referred to as a "remote" management API, the API 322 may be equally capable of managing local adapters.

The RMAPI 322 may be a robust remote management interface that is consistent across different platforms and operating systems, such as Windows NT/2000, Solaris, AIX, HP-UX and Linux, for example, via the Java application 307, and applicable to any HBA in any environment.

The RMAPI 322 may be dynamically loaded by any application 310, 312, 314 or 307 on the remote manager computer 103 that wishes to perform remote management.

In a Microsoft Windows environment, the RMAPI 322 may exist as a Windows dynamic link library (DLL). Under the various Unix environments, the RMAPI 322 may be in the form of a shared object library.

The RMAPI 322 may be multi-threaded, which allows more than one application to access the libraries 326 concurrently.

Figure 9:
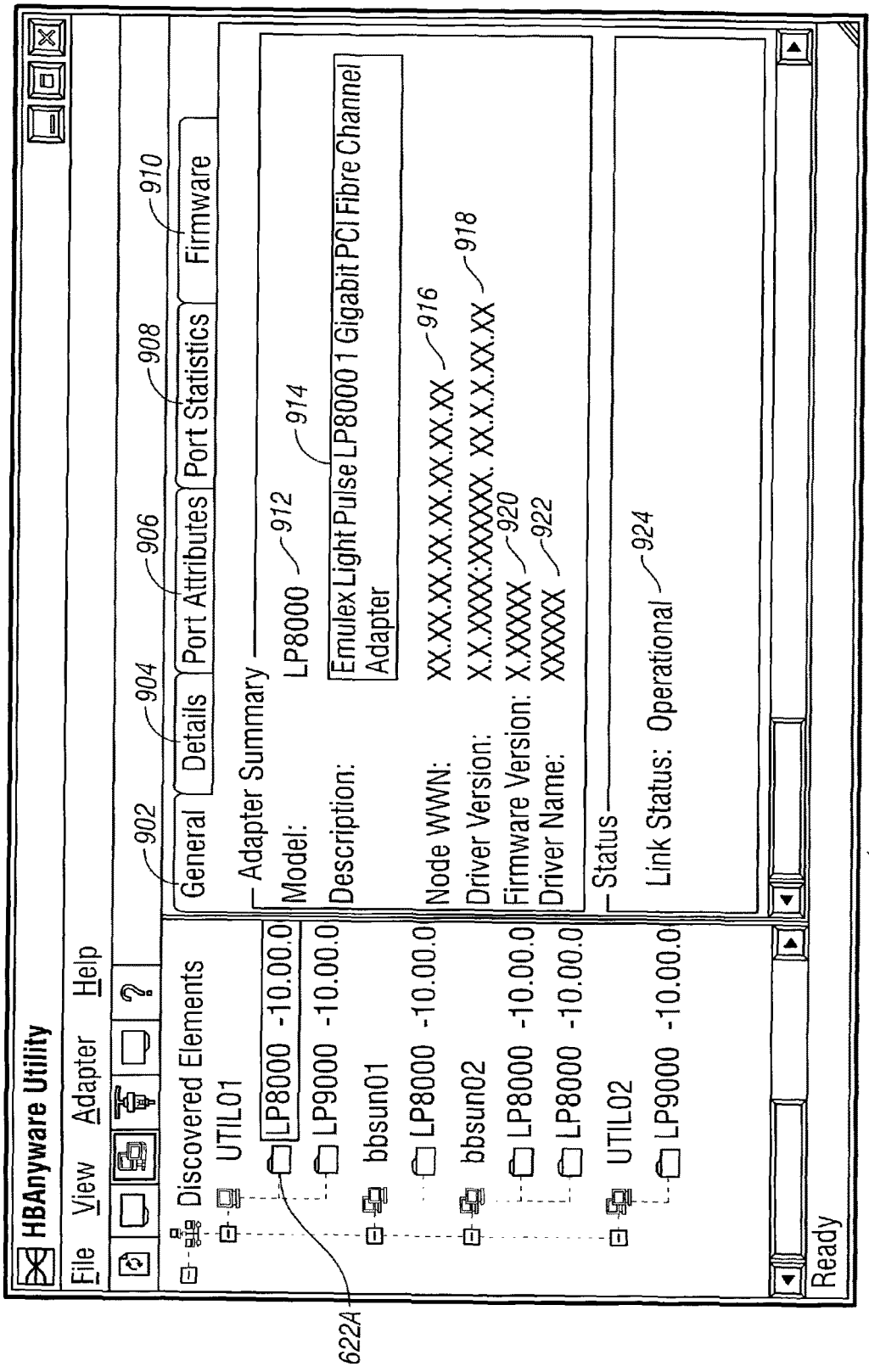
FIG. 9 is a screen shot of one embodiment of another application window that may be provided by the client at the remote manager.
Figure 10:
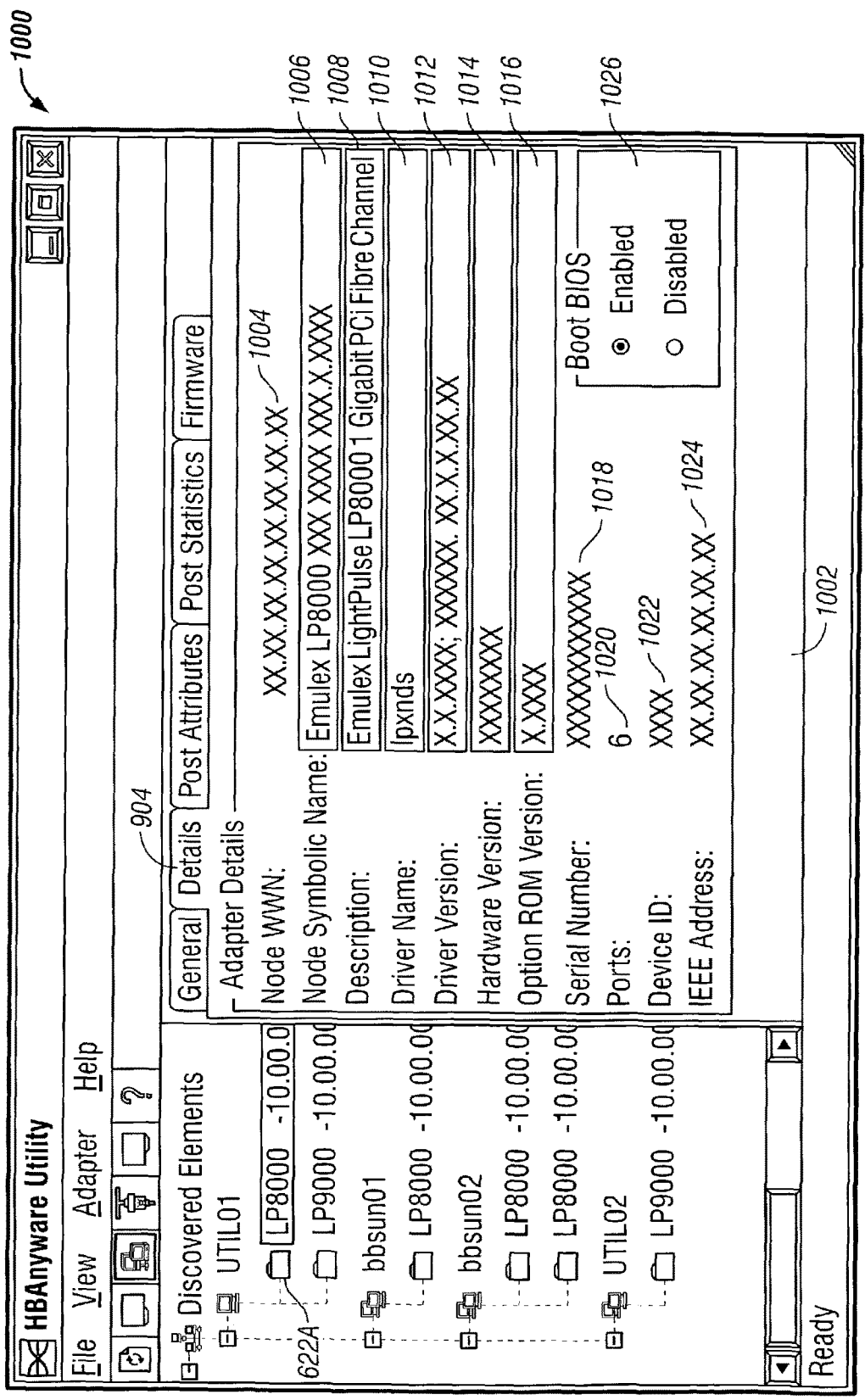
FIG. 10 is a screen shot of one embodiment of another application window that may be provided by the client at the remote manager.
Figure 13:
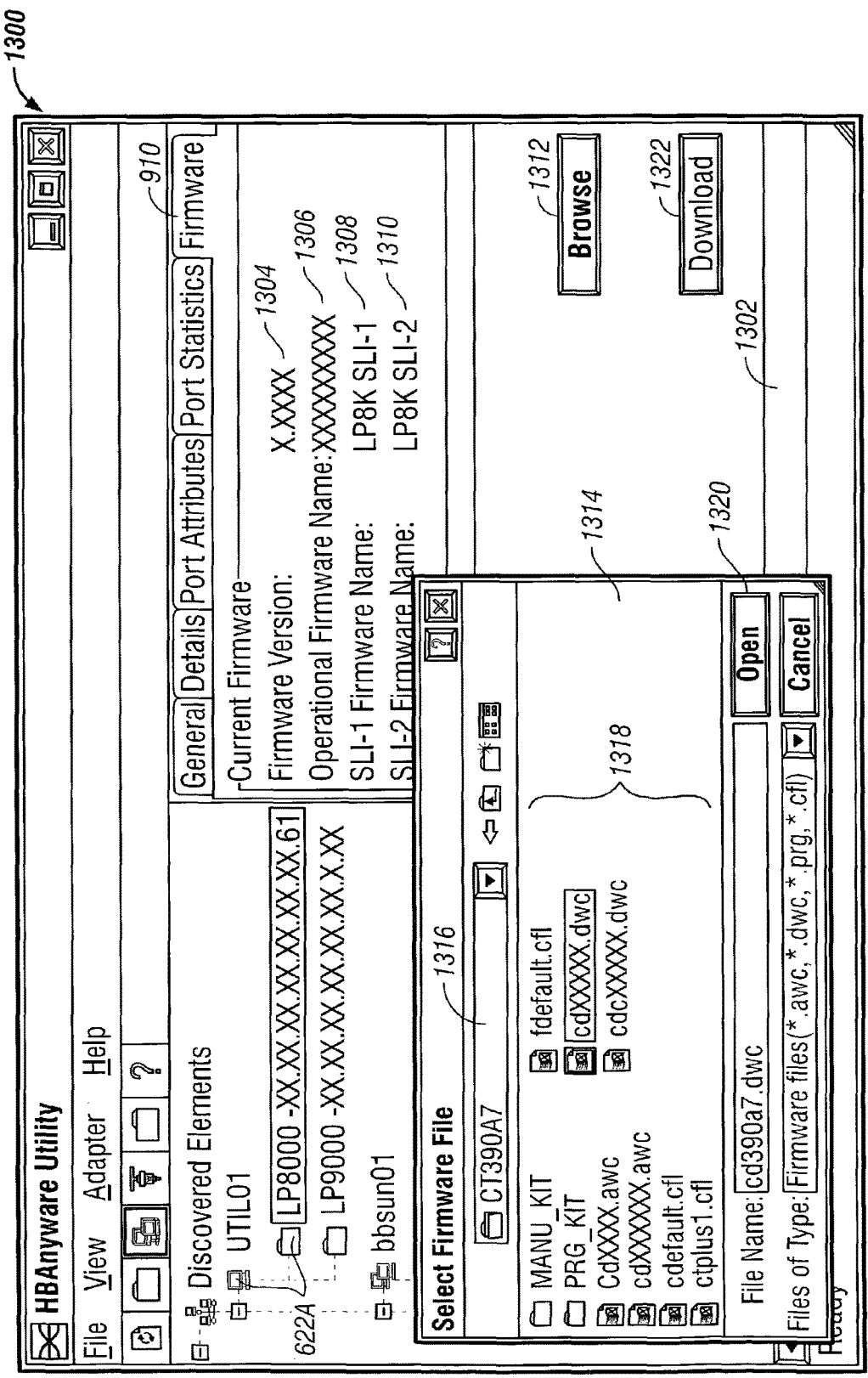
FIG. 13 is a screen shot of one embodiment of another application window that may be provided by the client at the remote manager.
Figure 14:
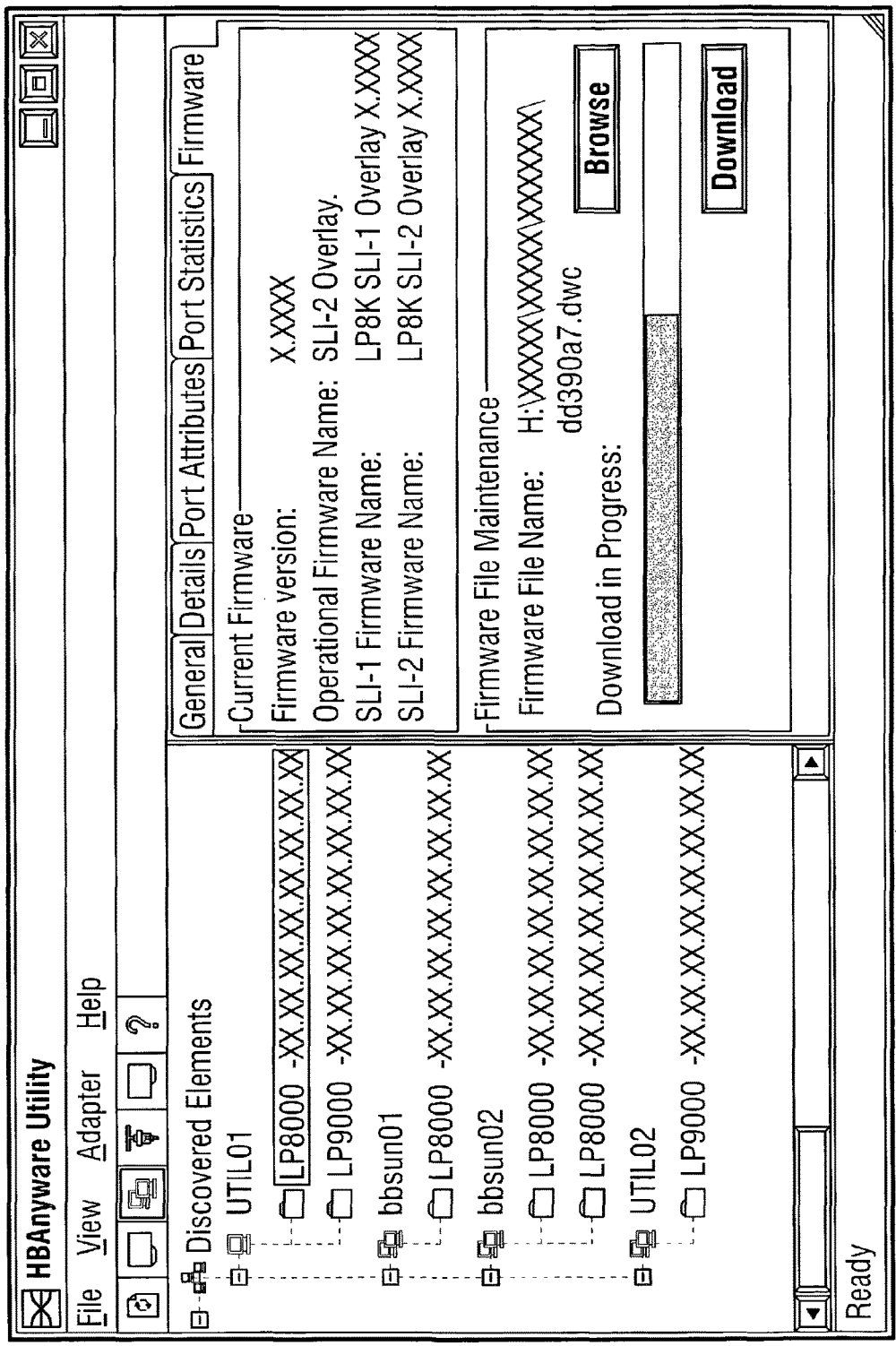
FIG. 14 is a screen shot of one embodiment of another application window that may be provided by the client at the remote manager.

The RMAPI 322 may provide the following broad categories of management RMAPI functions:

Load a specified firmware image (file) to local and remote HBAs 112A-112D with specified WWNNs; the file can be any file accessible to the client 102 (see FIGS. 13-14);

Retrieve, view and modify driver parameters of local and remote HBAs 112A-112D (see FIGS. 9-10);

Manage and load remote drivers;

Manage, maintain and add persistent bindings; a persistent binding is a relationship that a SAN administrator establishes between a physical device on the SAN 50 and a logical device as seen by the operating system;

essentially, persistent bindings exist as a table of data that match each physical SAN device to a logical OS device;

Reset one or more HBAs 112A-112D with one or more specified World Wide Port Names; and Set or change IEEE addresses of HBAs 112A-112D.

Figure 6:
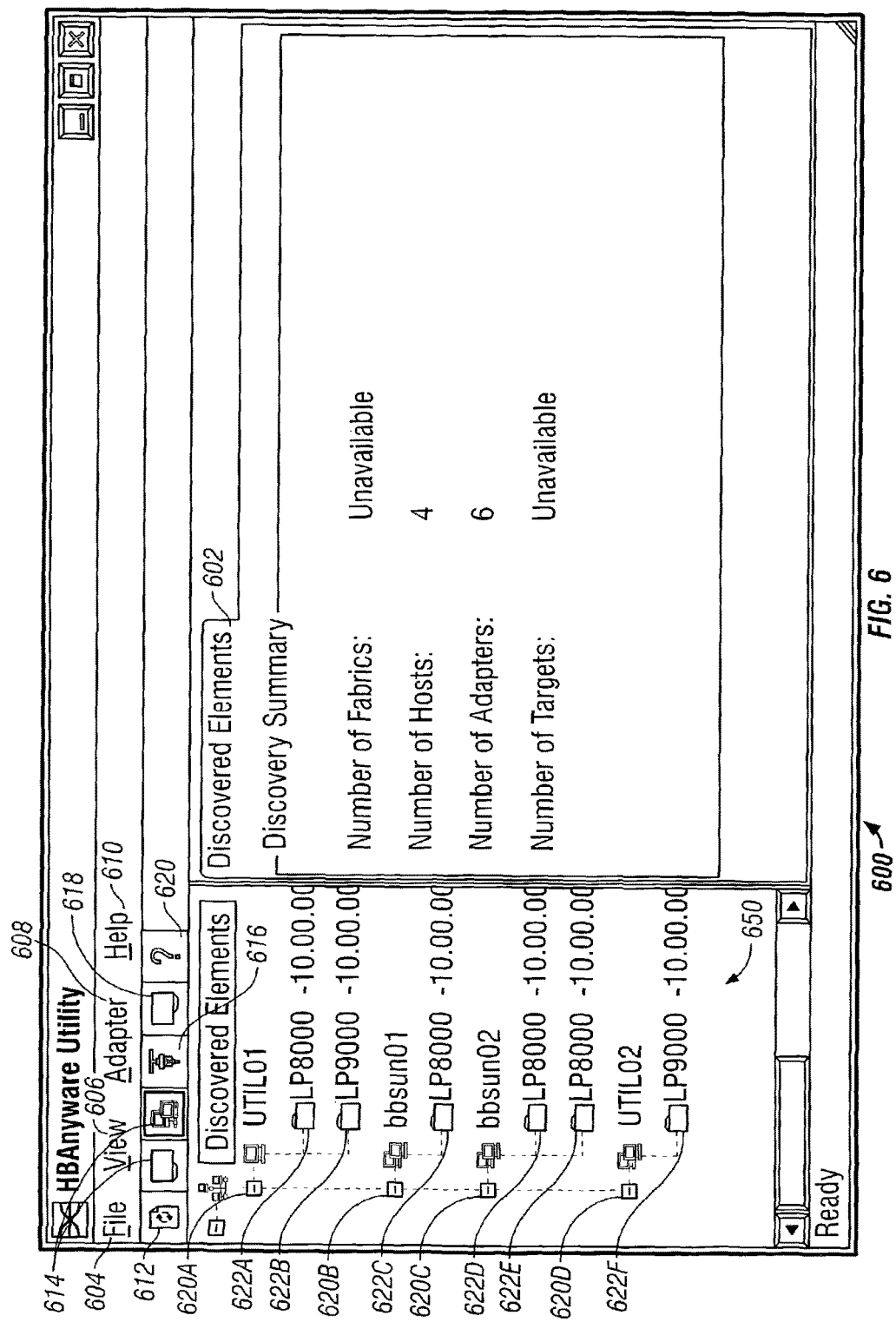
FIG. 6 is a screen shot of one embodiment of an application window that may be provided by the client at the remote manager.
Figure 7:
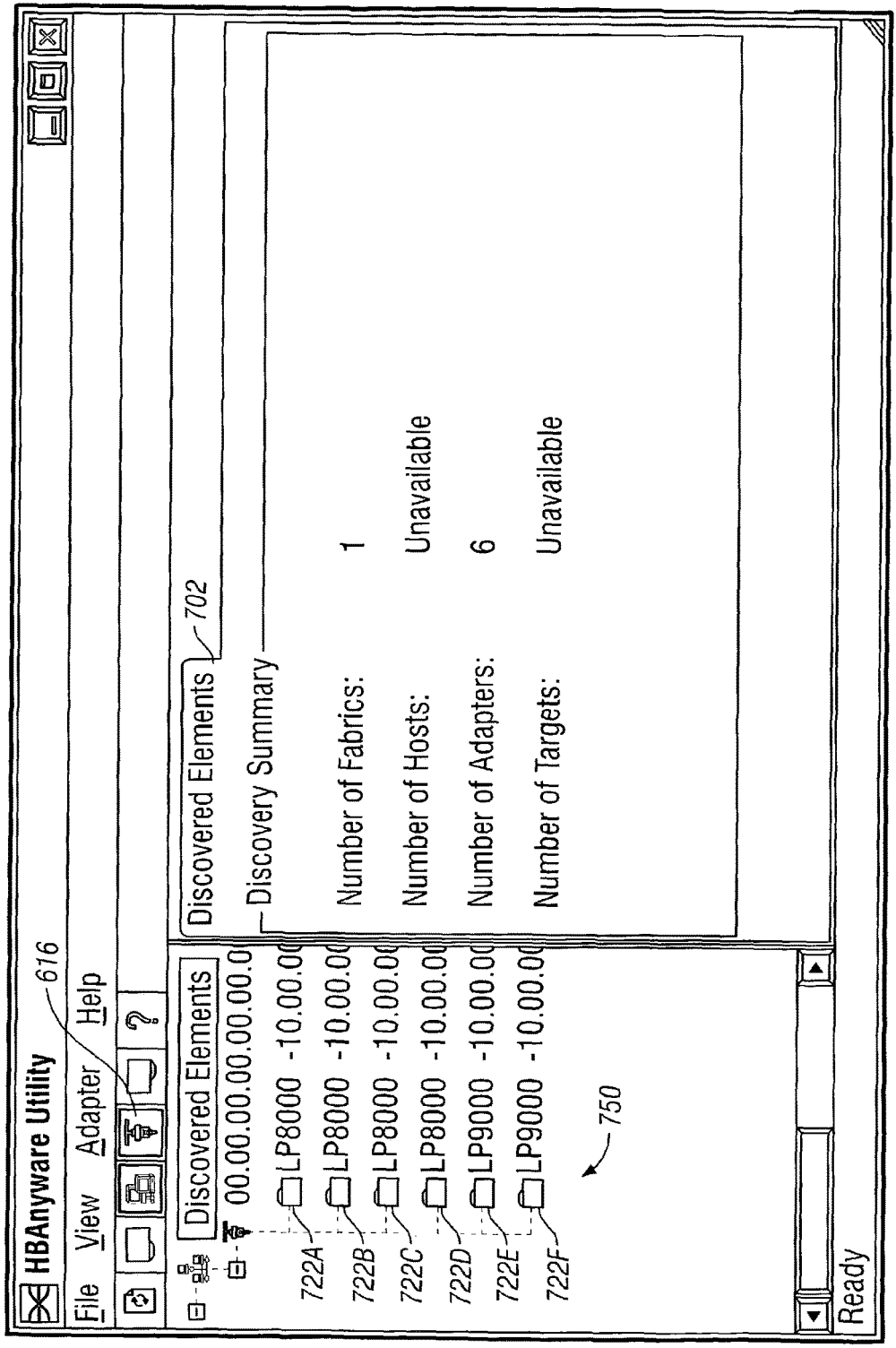
FIG. 7 is a screen shot of one embodiment of another application window that may be provided by the client at the remote manager.
Figure 8:
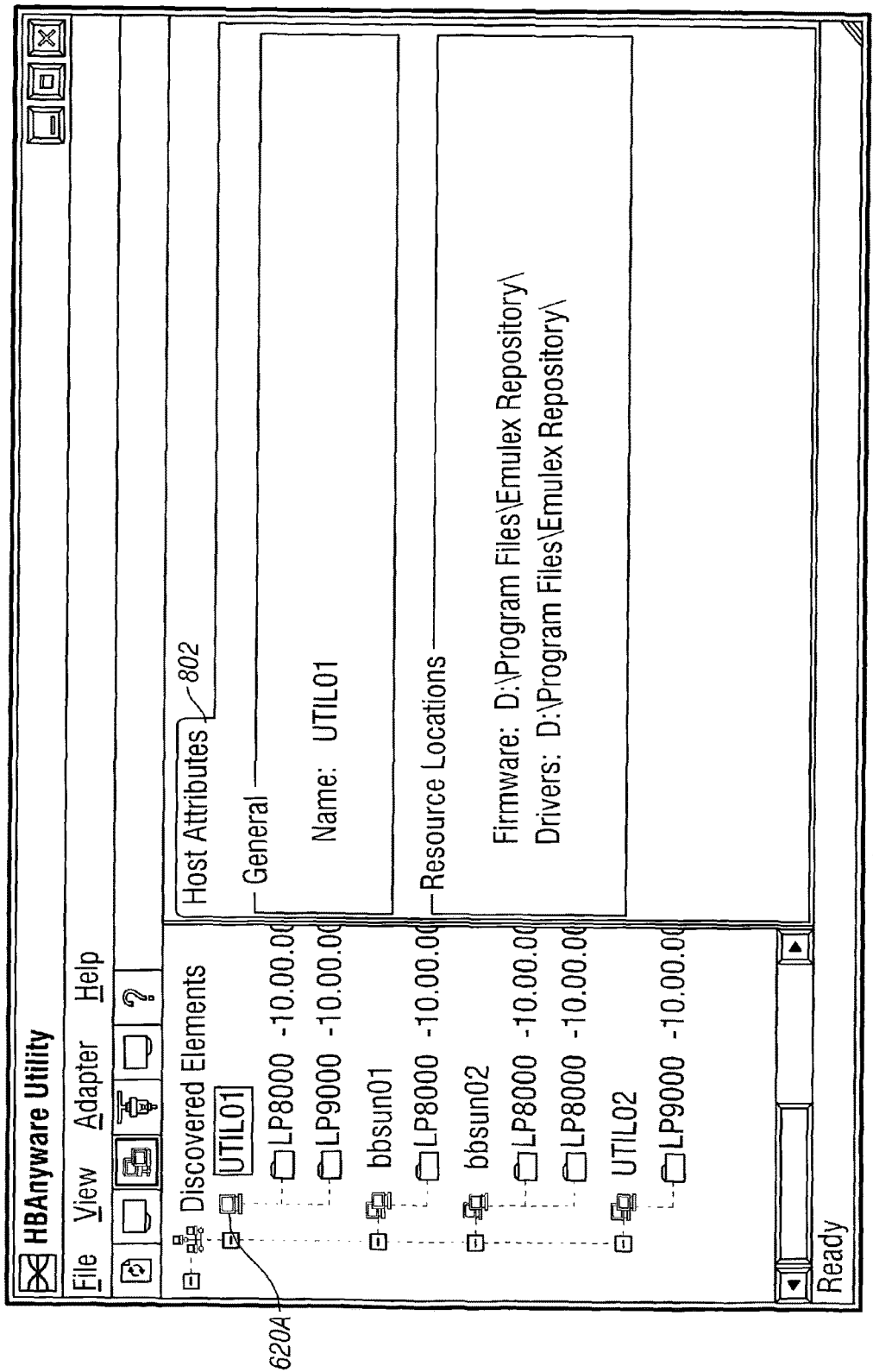
FIG. 8 is a screen shot of one embodiment of another application window that may be provided by the client at the remote manager.
Figure 11:
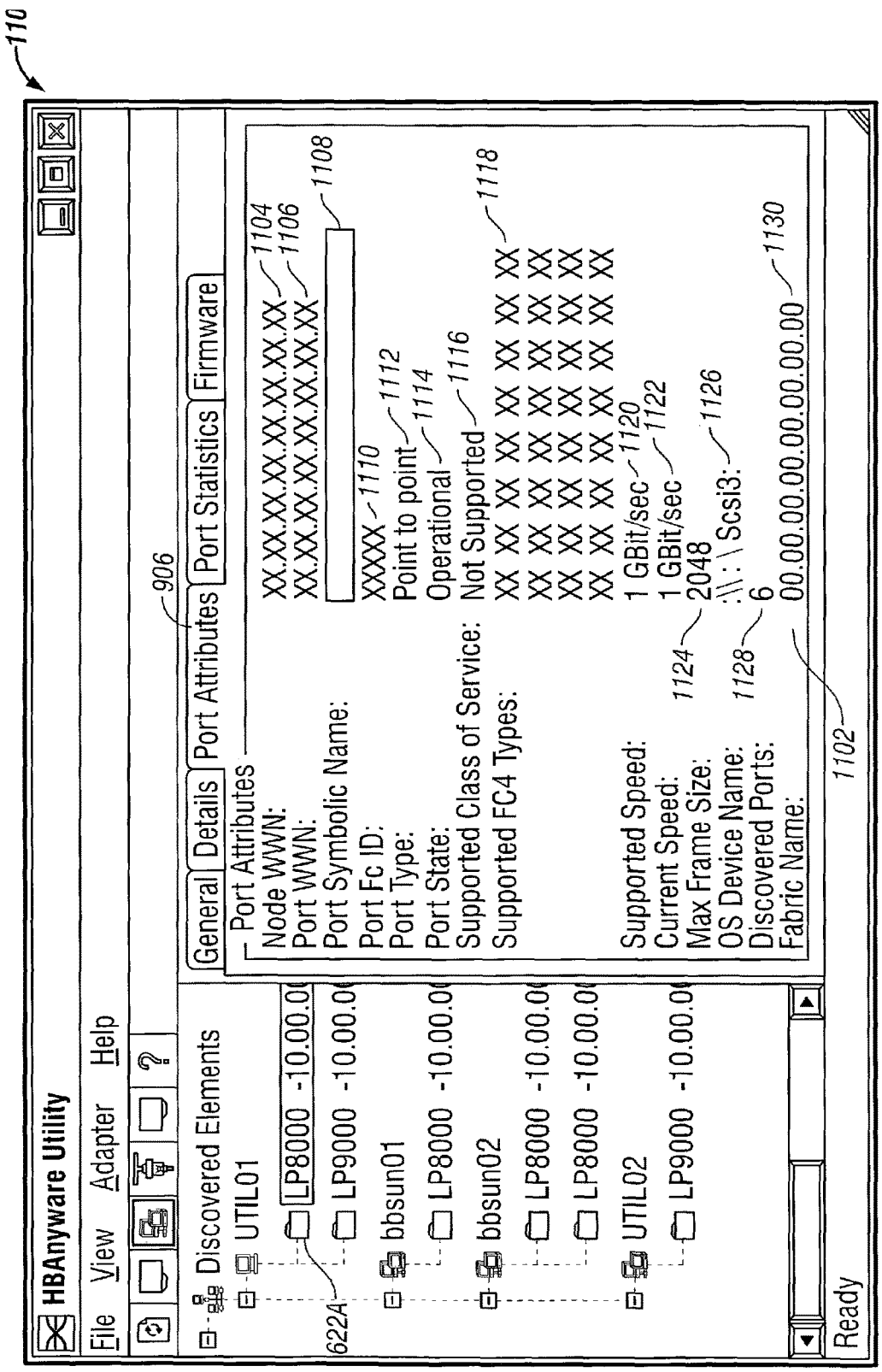
FIG. 11 is a screen shot of one embodiment of another application window that may be provided by the client at the remote manager.
Figure 12:
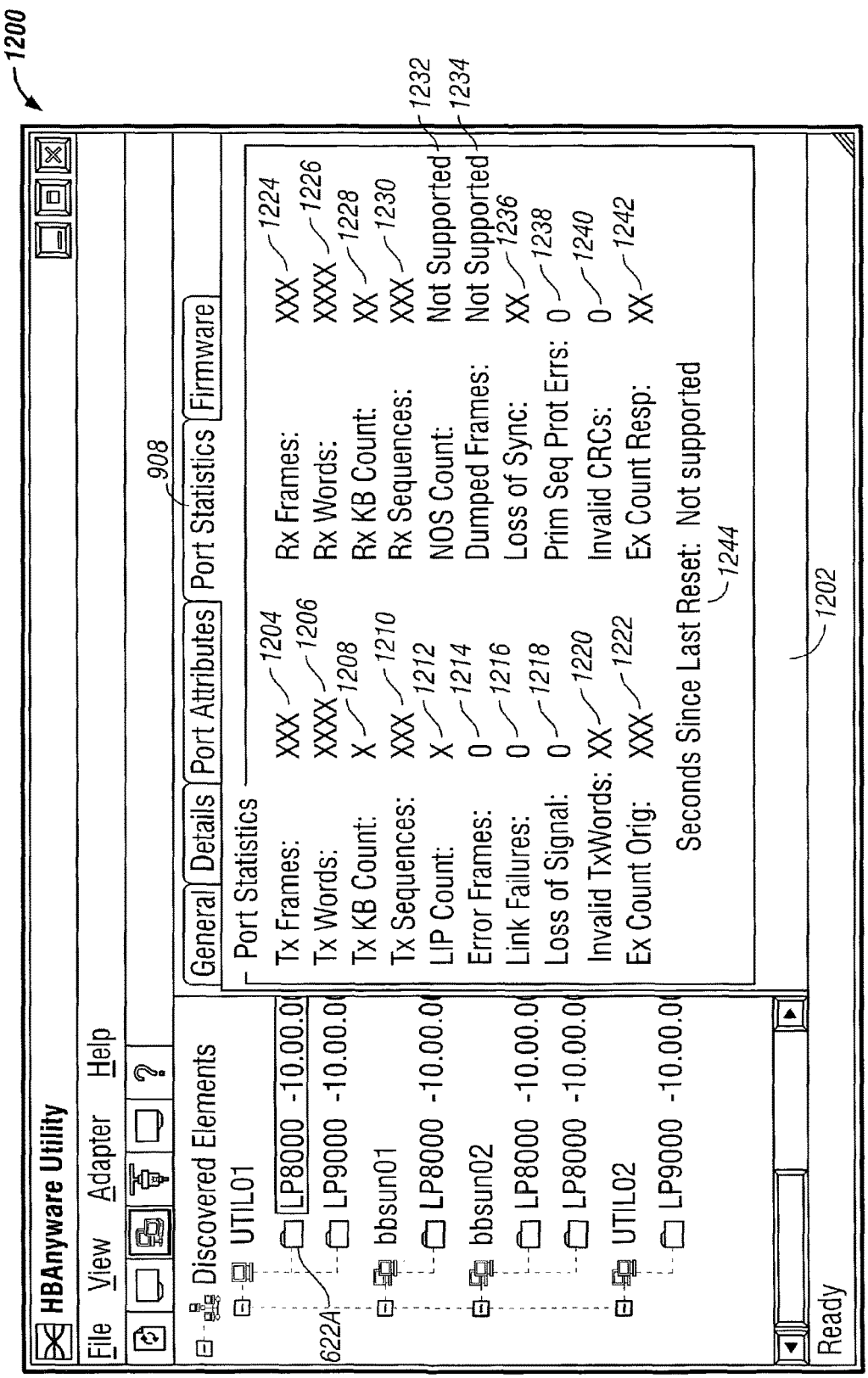
FIG. 12 is a screen shot of one embodiment of another application window that may be provided by the client at the remote manager.

Specific functions of the RMAPI 322 or the client 102 may include:

Run an HBA diagnostic;

Display a list of discovered manageable HBAs 112A-112D and their World Wide Node Names (see FIGS. 6 and 7);

Display and set a list of HBA attributes/parameters for the local or remote HBA 112 with each specified World Wide Node Name (see FIGS. 9-10);

Display and set a list of port attributes/parameters for the local or remote port with a specified World Wide Port Name (see FIG. 11);

Display a list of port statistics for the port with a specified World Wide Port Name (see FIG. 12);

Reset the port statistics for the specified port to zero;

Display and set a list of attributes for a specified server (see FIG. 8);

Display a list of mapped targets for the port with each specified World Wide Port Name (see FIGS. 6 and 11); and Display a list of device driver attributes for the port with the specified World Wide Port Name (see FIGS. 9-10).

FIGS. 15A-1 and 15A-2 illustrate one embodiment of major RMAPI function categories, individual RMAPI functions and their associated FC-CT commands. FIGS. 15B-1 and 15B-2 illustrate examples of HBAAPI functions and RMAPI functions.

Many of the functions performed by the client 102 may be Fibre Device Management Interface (FDMI) functions. While the client 102 will implement the Get_HBA_Attributes function, for example, the client 102 may use a vendor-unique GS_Type value of 0x0A, not the standard GS_Type=0xFA specified by the FC-GS Specification for the FD_MI Management service. FC-GS stands for Fibre Channel Generic Services, which is an industry standard specification well known to the Fibre Channel community. Also, the FC-CT Command Code may not necessarily be 0x0101.

Other functions may be unique, and no real model exists in the Fibre Device Management Interface (FDMI) or in the Fibre Channel Methodologies for Interconnects (FC-MI). One example is the download firmware operation described below.

The attributes of the RMAPI functions may include all standard HBAAPI functions (see FIGS. 15B-1 and 15B-2 and Appendix B), as well as additional functions described below. The RMAPI 322 (see pages 6-25 of Appendix A) is intended to migrate the local capabilities provided by HBAAPI (see Appendix B) to include both local and remote access. Thus, HBAAPI functions may represent a subset of RMAPI functions.

HBA-Specific RMAPI Libraries

In one embodiment, the RMAPI 322 may dynamically load separate RMAPI libraries 325A, 325B for specific types of HBAs 112. For example, in FIGS. 3A-3B, there are two HBA-specific RMAPI libraries: the Fibre Channel RMAPI (FC-RMAPI) 325B and the iSCSI RMAPI (ISCSI-RMAPI) 325A. The RMAPI 322 forwards generic management requests received from an application to an appropriate library 325. These HBA type-specific libraries 325A, 325B may handle the bulk of the processing for a request. Each library 325 may provide programmatic access to management functions.

The RMAPI 322 may intentionally be similar in some ways to the wrapper library component of the standard HBAAPI architectural paradigm (see Appendix B) developed by SNIA, a committee of companies.

RMAPI Library for FC HBAs (FC-RMAPI)

The FC-RMAPI 325B may be dynamically loaded by any application, such as one of the applications 310, 312, 314 or 307, that wishes to perform remote management. The FC-RMAPI 325B may combine the core functionality of the SNIA HBAAPI, an Emulex LightPulse utility and a set of new functions into a single, cohesive Application Program Interface. Any HBA 112, located either locally or remotely, may be manageable via the FC-RMAPI 325B.

The FC-RMAPI library 325B accepts management requests from the RMAPI 322 and prepares the requests for delivery to the appropriate remote or local HBA 112. The FC-RMAPI 325B may use the Common Transport (CT) protocol layer of the Fibre Channel Generic Services (FC-GS) to communicate management requests to HBAs 112A-112D.

FC-CT Commands

The FC-RMAPI 325B is operable to map an RMAPI management function into a corresponding FC-CT command, as shown in FIGS. 15A-1 and 15A-2. In some cases, there may be a one-to-one correspondence between an RMAPI function and an FC-CT command.

A specific set of extended FC-CT commands may be created for the FC-RMAPI 325B. FIGS. 24A-24B illustrate examples of vendor-unique FC-CT Command codes.

A standard CT command set may be extended with commands that perform the following broad categories of functions:

Send/download a file resource (e.g., a firmware image) to an HBA (see FIGS. 13-14);

Get remote file resources;

Set boot BIOS state; enable/disable boot BIOS

Manage HBA files, i.e., firmware files, driver files, library files;

Retrieve and modify HBA attributes, port attributes & statistics and driver parameters (see FIGS. 9-12);

Initiate device-specific actions such as firmware file download (see FIGS. 13-14), driver installation and HBA reset; and Retrieve HBAAPI-compatible information from remote HBAs.

The device driver 332 in FIG. 3B puts an FC-CT command packet in a Common Transport Information Unit (CT_IU) Request to be transmitted via the fabric 100. A fabric device is not an absolutely required component of a SAN 50. HBAnyware commands are directed to remote HBAs, and they may pass through a fabric device in route. The abbreviation for Common Transport Information Unit is specifically called out in Fibre Channel standards as "CT_IU," which may also be referred to as "CT IU," "CTIU," and "CT-IU" herein. Thus, there are three levels of commands/functions/routines: (a) RMAPI functions; (b) FC_CT commands; and (c) CT_IU Requests placed in IOCTL functions/routines.

As stated above, a software company may develop a software application that accesses RMAPI functions via the RMAPI 322 (FIGS. 3A-3B). On the other hand, a device manufacturer may develop a hardware device, such as a switch or a RAID storage device, for the fabric 100 that does not have access to a software library, but instead uses CT commands directly. Thus, there are two possible interfaces (RMAPI 322 and CT commands) that third party companies may access to perform remote management.

To accommodate the FC-CT protocol applications described herein, some extensions may be made to the existing CT standard. For example, recipients of FC-CT requests may be well-known fabric addresses, e.g., services such as name service or time service. A Fibre Channel fabric device should provide a set of services to the SAN 50. Other SAN devices may access the features of these services by issuing commands to the well-known Fibre Channel addresses that these services are required to have. The FC-RMAPI 325B may send an FC-CT request to a specific target, such as a specific World Wide Port Name (WWPN) of a device port on the Fibre Channel 100. The intended target address may be inserted into the FC-CT request header.

FC-CTs and CT_IUs are described in more detail below after other components of the client 102 and agent 104 are described.

In-Band and/or Out-of-Band Transport

The CT request may be transportable either in-band over the Fibre Channel, or out-of-band over an Ethernet. For example, the FC-RMAPI layer 325B may have three interfaces directly beneath it: an IP-based FC-CT handler 328 for out-of-band communication, an in-band FC-CT handler 330 and a Fibre Channel device driver/IOCTL interface 332. The FC-RMAPI layer 325B will forward the management request to either the in-band FC-CT handler 330 or the out-of-band IP-based FC-CT handler 328, depending on which transport medium is selected. All remote management requests may be routed through either the out-of-band IP-based FC-CT handler 328 or the in-band FC-CT handler 330. All local HBA management requests may be routed to the Device Driver/IOCTL interface 332.

The handlers 328, 330 and interfaces 330, 332 may add appropriate headers to command packets, and ensure that the request is sent out over the appropriate medium.

RMAPI Library for iSCSI HBAs (ISCSI-RMAPI)

The ISCSI-RMAPI library 325A accepts management requests from the RMAPI 322 and prepares the request for delivery to the appropriate remote entity on an IP storage network, such as the SAN 50.

The ISCSI-RMAPI library 325A may be able to package up and deliver, in some manner suitable to the iSCSI protocol, the following management commands:
Retrieve HBA attributes
Send a file resource (e.g., a firmware image to an HBA 112)
Download firmware
Get remote file resources
Set boot BIOS state

In-Band FC-CT Handler

The in-band FC-CT handler 330 is responsible for transmitting in-band FC-CT HBA management requests. The in-band FC-CT handler 330 receives a fully specified FC-CT IU as input and encapsulates it as appropriate for transport over the Fibre Channel 100. The In-band FC-CT handler 330 may have a sole interface entry point, "SendMgmtCommand," through which the RMAPI 322 passes a FC-CT IU containing the management request, and the location of a buffer in a host memory that will receive the response CT_IU. This may be a synchronous routine that will be blocked until either a response has been received or the request has timed out.

IP Based FC-CT Handler

The IP-Based FC-CT handler 328 is an encapsulation layer for IP-based FC-CT requests. The IP-Based FC-CT handler 328 may take a fully specified FC-CT IU as input and encapsulate it with appropriate IP headers for transport over an Ethernet 130.

Java Native Interface

In general, the Java native interface layer 319 gives Java applications 307 the ability to call "native" routines, which are routines coded specifically for the platform type upon which the code is running. Specifically, the Java native interface layer 319 will be used to interface the Java remote management application 307 with the Remote Management API (RMAPI) 322, which may be written in native C code.

Putting the Java native interface 319 in place may involve no real coding effort per se. Routines in the RMAPI dynamic library (DLL in a Windows environment or a shared object library in a Unix environment) may be mapped to corresponding Java classes. This may be done fairly quickly using some available automated tools plus some modifications.

XML Page Server

Web browsers and other XML-aware applications may involve the option of converting information returned from a managed component into an XML compliant document. XML is becoming a widely used standard for exchanging information. Data presented in the form of an XML document has the advantage of being easily integrated into and manipulated by web browsers and other XML aware applications.

Through the XML page server 320, an application 310, 312, 314 may be able to request an XML document containing, for example, a remote HBA's port statistics table (not shown). The XML page server 320 retrieves the requested data via the RMAPI 322, uses the data fetched from the RMAPI 322 to assemble an XML document, and returns the XML document to the application 310, 312 or 314.

XML Parser

One or more XML parsers 316 may be used to interpret XML documents. The XML parser 316 scans the XML document and renders the document in a format usable by an application 310, 312 or 314. Many XML parsers are commonly available.

Java XML Parser

If the RMC 102 supports both Java and XML, there may be an XML parser 318 specifically designed for Java applications. There are several widely available XML parsers for Java, such as "XML for Java."

XML Application

An application 314 that can deal with XML documents may be called "XML aware." For example, a web browser (Netscape or Internet Explorer version 5.0 or later) is an XML-aware application.

Native Application

Each platform developed by Emulex may have a native application 310 for local HBA management. Many of the functions provided for remote management may be similar to functions for local management. The native application 310 may extend these local HBA management routines to handle remote operations.

Java Application

The Java application 307 may have the advantages of code portability and cross platform maintainability. In addition, the Java application 307 may provide a consistent look and feel across all platforms. "Just-in-time" (JIT) compilers may be used to translate bytecode into machine native code at runtime.

Repository

Several FC-RMAPI functions may operate on files located on remote servers 110A, 110B. For example, there may be requirements to send a file (e.g., firmware) from the client 102 to a remote server 110, to change the name of an existing file on a remote server 110, and to retrieve a list of files available on a remote server 110. To perform such operations, the files may be located in pre-defined locations on both local and remote host servers 103, 110A, 110B.

A special repository 340 (FIGS. 3A-3B) may be used to hold files transferred between two hosts. The repository 340 may comprise a directory on a disk of a host machine. These files are typically firmware images that are intended to be downloaded to the HBA.

Before an HBA file can be sent to a remote server 110, the file should first be imported into the local repository 340 since this is the implied starting point for the operation. Similarly, after sending an HBA file to a remote server 110, that file may reside in a repository 450 (FIGS. 4A-4B) of the targeted remote host server 110.

An added feature of the repository 340, 450 is that the names of the HBA files contained therein may be such that the files can be managed by the file system of any host application, whether Windows or Unix based. Thus, importing an HBA file into the repository 340, 450 may also include transforming the file name into a format that syntactically acceptable on all OS platforms.

Remote Downloading with Repositories

Figure 22:
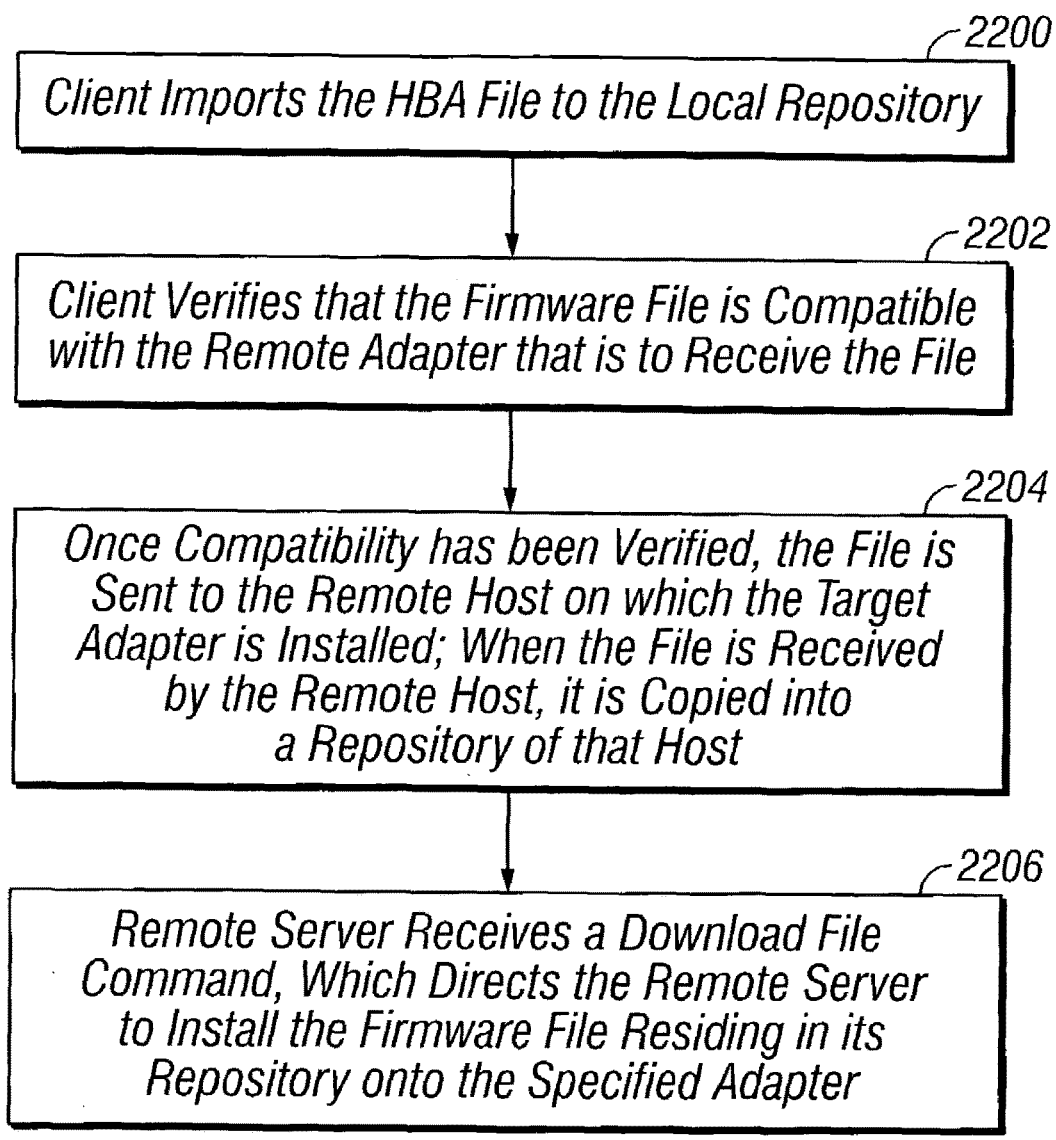
FIG. 22 illustrates a method of downloading firmware to a remote server.

FIG. 22 illustrates a method of downloading firmware or a device driver to a remote server. A firmware file is located on a local host 103, which wishes to copy and install that file to an adapter 112 on a remote server 110.

In a block 2200, the client 102 imports the HBA file to the local repository 340 (FIGS. 3A-3B). If the file was imported on behalf of a previous operation, this step is unnecessary.

In a block 2202, the client 102 verifies that the firmware file is compatible with the remote adapter 112 that is to receive the file. A firmware file may be compatible if the file has a good checksum and its type matches the adapter type.

In a block 2204, once compatibility has been verified, the file is sent to the remote host 110 on which the target adapter 112 is installed. When the remote host 110 receives the file, the file is copied into a repository 450 of that host 110.

In a block 2206, the remote server 110 receives a download file command, which directs the remote server 110 to install the firmware file residing in its repository 450 onto the specified adapter 112.

IOCTL Interface and IOCTL Functions

The driver IOCTL interface 332 may be transparent to components of the SAN 50, as well as to software that accesses the RMAPI 322. By their very nature, IOCTL interfaces may be vendor unique, non-portable, and do not comply with any industry standard. The HBAnyware client 102 or agent 104 (FIG. 2B) issues IOCTL commands to the driver 216 in order to obtain the information that the client 102 or agent 104 needs, but the RMAPI interface 322 and/or the CT interface 325B abstract this interface 332 from any outside party.

One or more platform device drivers 332, 400 in FIGS. 3A-3B and 4 may be extended to provide a new set of IOCTL functions. These IOCTL functions/routines may provide a mechanism to transmit management command and responses between separate nodes on a Fibre Channel network, e.g., a response to a remote server 110, and receive a management response from the remote server 110. For example, the IOCTLs may provide a mechanism to inform the device driver 332 at the remote manager client 102 to transmit a CT Request (command) to a remote server agent 104, and to receive a response to that command from the remote server agent 104.

The nodes communicate with one another using a vendor-unique set of commands transmitted as FC Common Transport sequences. These IOCTLs routines are provided by a device driver or by a diagnostic library closely bound to a device driver.

The IOCTL command set below allows a node to act as either a client node 103 or a server node 110, or as both a client node and a server node concurrently. A client node may issue a management request at any time, and a server node should be prepared to respond to unsolicited management requests.

The FC Common Transport provides a request and response mechanism. The client node 103 will issue a management request in the form of a Common Transport Information Unit (CT_IU). This CT_IU will contain the D_ID of the fabric, WWPN of the node 110 that is to receive the request (HBAnyware commands are addressed to a specific HBA 112 using the WWPN of that HBA 112), the request command code, the parameters required by the request, and any associated payload data. Each request will result in either an Accept Response or a Reject Response from the remote node 110 in the form of a CT_IU. The Accept Response IU will contain status data and payload data associated with the command. The Reject Response IU will contain error information indicating the reason for rejection.

Appendix C lists examples of IOCTL routines/functions that may be used to transport FC-CT commands.

RegisterForCTEvents

An IOCTL function called RegisterForCTEvents ((void*) (callback function)(CTPKT* ctPkt, UINT ctSize)) may register a callback routine, which is dispatched by a device driver 400 (FIGS. 4A-4B) whenever a remote management command is received by an agent's remote command module 410. The FC-CT remote command module 410A will call this callback routine to enable the receipt of remote commands.

The RegisterForCTEvents IOCTL may be used by a host server 110 to inform the device driver 400 that the server 110 wants to be informed when an FC-CT Management Command is received, and to provide a mechanism, such as a function call, by which the device driver 400 may do so.

The in-band FC-CT remote command module 410A registers with the driver 400 via its RegisterForCTEvents IOCTL and provides a callback routine. When the driver 400 receives an incoming command, this callback routine will post the command to the in-band FC-CT remote command module, which posts the command to a RMA kernel command dispatcher or dispatch routing 412.

The RegisterForCTEvents routine provides a means for the device driver 400 (FIGS. 3A-3B) to notify the server application (agent) 104 that a management request has arrived. The server application 104 calls the RegisterForCTEvents routine once to register its wish to receive notification of future requests, and specifies a callback routine to be invoked as a means to receive notification.

After a server application 104 calls RegisterForCTEvents, the driver 400 will invoke the callback routine once for each incoming request. The callback routine receives a pointer to the incoming CT request and a unique tag value assigned by the device driver 400. This tag is used by the driver to associate this command with a subsequent response.

UnRegisterForCTEvents

The host server 110 may use another IOCTL function called UnRegisterForCTEvents to unregister for CT events. The UnregisterForCTEvents routine is provided so that a server application 104 can cancel the callback effect of a previous RegisterForCTEvents call.

SendMgmtCommand and SendMgmtResponse

Two IOCTL functions for sending management commands and management responses are called SendMgmtCommand (UINT32 adapter, UCHAR *destWWN, CTPKT* cmdPkt, UINT cmdSize, CTPKT* rspPkt, UINT rspSize, UINT32 tag) and SendMgmtResponse (UINT32 adapter, UCHAR *destWWN, CTPKT* rspPkt, UINT rspSize, UINT32 tag). The purpose of SendMgmtCommand is to transmit a management command from the client 102 to an agent 104. The purpose of SendMgmtResponse is to transmit a management response from an agent 104 to the client 102. These commands and responses may be carried via FC-CT.

The SendMgmtCommand may provide a variant of HBA API's CT pass-through mechanism to send commands that can be targeted to a specific World Wide Port Name. An FC management service 130A at the agent 104 may use this function to respond to remote commands from the client 102.

The SendMgmtCommand routine is responsible for all tasks required to send the request to the remote destination node 110, including any login activity required to complete the request. The SendMgmtCommand routine may be a blocking synchronous function that does not return a status until the remote node has responded to the request with an Accept or Reject CT_IU. The functionality of the SendMgmtCommand routine may be very similar to the HBA_SendCTPassthru routine provided by the HBA API library.

The RMAPI 322 will construct a CT_IU structure that contains the management request. The target of the management request is specified by the targetWWN parameter of the SendMgmtCommand routine. The command should be routed by the driver to the adapter 112 specified in the destWWN field of the SendMgmtCommand routine. The GS_Type and GS_Subtype fields of the CT_IU may contain any value, and the routines specified in this document should make no attempt to parse these fields.

Once the server application 104 has received the management request, it can issue a response using the SendMgmtResponse routine. The sever application 104 constructs a CT_IU structure that contains the response. The parameters to the SendMgmtResponse routine include a pointer to this response structure, and the unique tag of the management request being responded to. This tag allows the device driver 400 to associate the response to the XRI of the incoming request so that it may properly close the exchange.

The details surrounding the ability of the device driver 400 to invoke a function of a user-mode application 104 may differ greatly from one operating system to the next, and from one device driver model to the next. The code that actually invokes the callback routine may be separate from the device driver 400.

In the Solaris environment, the libdfc library already provides a separate component that runs in user mode, so support for a callback feature may involve extending this library. The Microsoft driver platforms could be more complex because the port driver or the miniport driver may not have a standard usermode component. Driver-level support may require the addition of a new software component (such as a kernel mode DLL, a user mode DLL, a filter driver, etc.). These details may be hidden behind the layer of abstraction provided by the FC-CT command set.

The FC-CT command set may assume that the code implementing the RegisterForCTEvents routine is able to allocate the buffer for incoming management commands and pass a buffer pointer to the callback routine. This model minimizes copying the buffer. In another embodiment, the model may be changed to make the server application 104 responsible for buffer allocation.

The tag mechanism is intended to allow the device driver 400 to save the exchange context of an incoming management request so that the subsequent response can use this context.

An effective command timeout mechanism may accommodate lengthy operations (like firmware downloads) and avoid process deadlock situations between separate CPUs.

The device driver 400 may be able to accommodate concurrent management requests from multiple client applications 102.

Management Applications that use this FC-CT command set may be required to use Authenticated CT sequences for security purposes. The 88-byte extended preamble specified in FC-GS3 may be used for every sequence transmitted.

Remote Management Agent (RMA)

The remote management agents 104A-104D in FIG. 1 may be loaded locally at each server 110, 103. Existing host drivers at the servers 110A, 110B may be modified to support the new relationship between HBAs 112A-112D. For example, a server 110 on the SAN network 100 may receive an unsolicited message from another server 103 and should be able to determine that the message is from a remote manager 103 on the network 100.

Figure 4A:
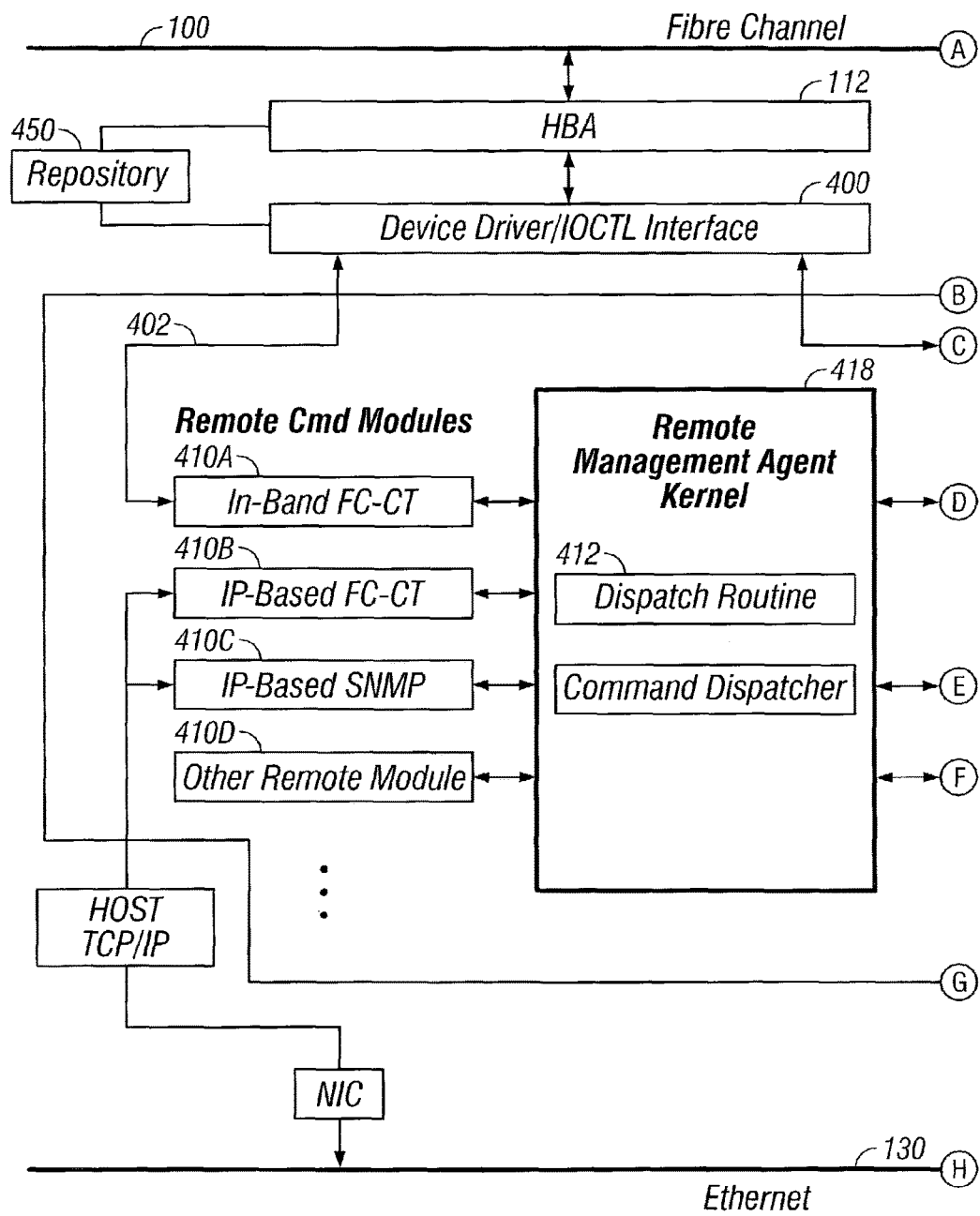
FIGS. 4A-4B illustrate one embodiment of a Fibre Channel, a host bus adapter (HBA), the remote management agent (RMA) and an Ethernet.
Figure 4B:
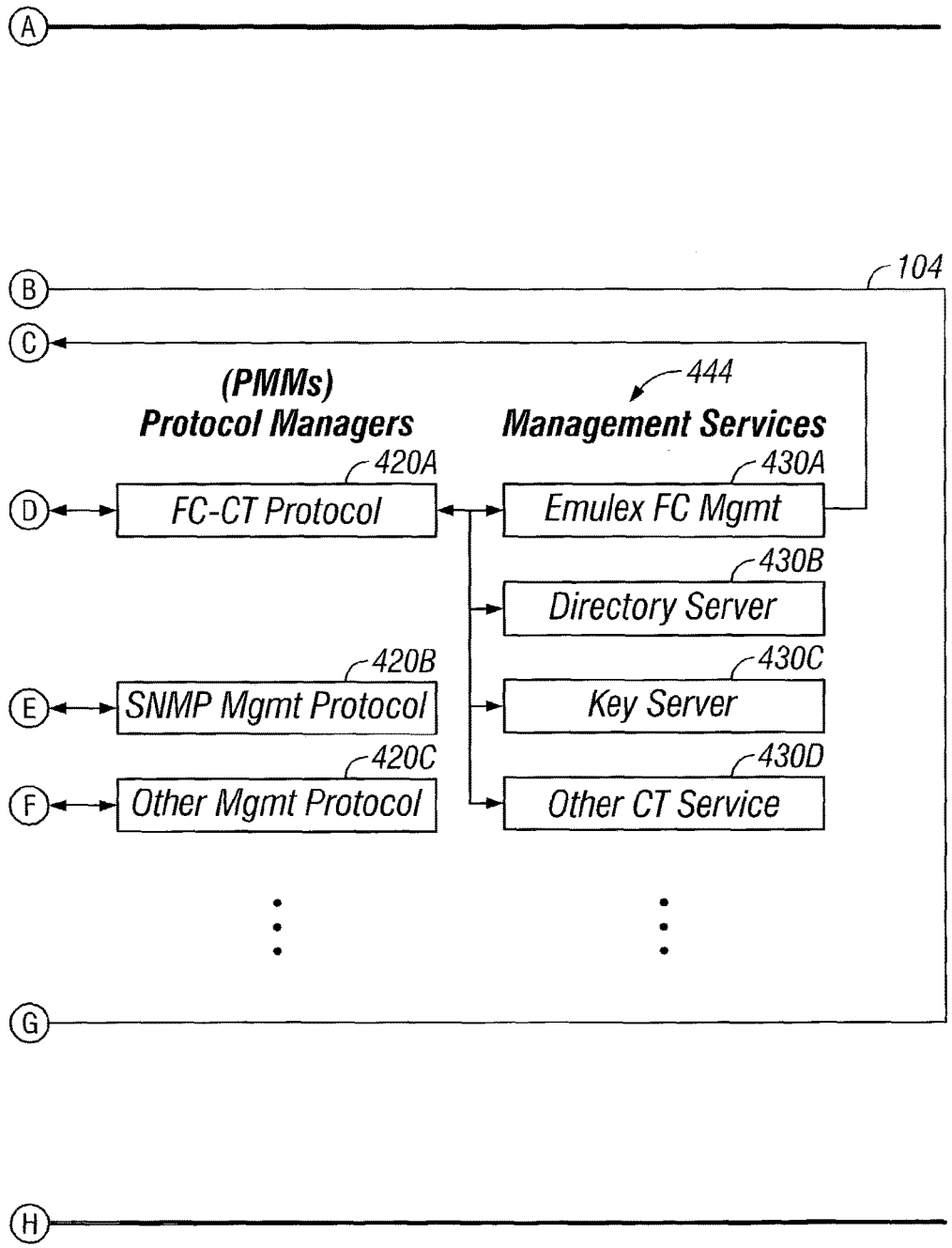

FIGS. 4A-4B illustrate one embodiment of the Fibre Channel 102, a host bus adapter (HBA) 112, a device driver/IOCTL interface 400, the remote management agent (RMA) 104 and an Ethernet 130. The remote management agent 104 may comprise a plurality of remote command modules 410A-410D, a remote management agent kernel 418, a plurality of protocol manager modules (PMMs) 420A-420C and a plurality of management services 430A-430D. Other embodiments of the agent 104 may comprise other components instead of or in addition to the components shown in FIGS. 4A-4B.

In general, the remote management agent (RMA) 104 is a collection of software components that may receive management commands from remote entities, such as the client 102, and pass those commands to an appropriate management service 130 for execution. The RMA 104 may be installed on any host CPU with a hardware device that is to be remotely managed. The RMA 104 may be a continually executing software component. The RMA 104 may be implemented as a Windows NT Service or as a Unix daemon.

Figure 5:
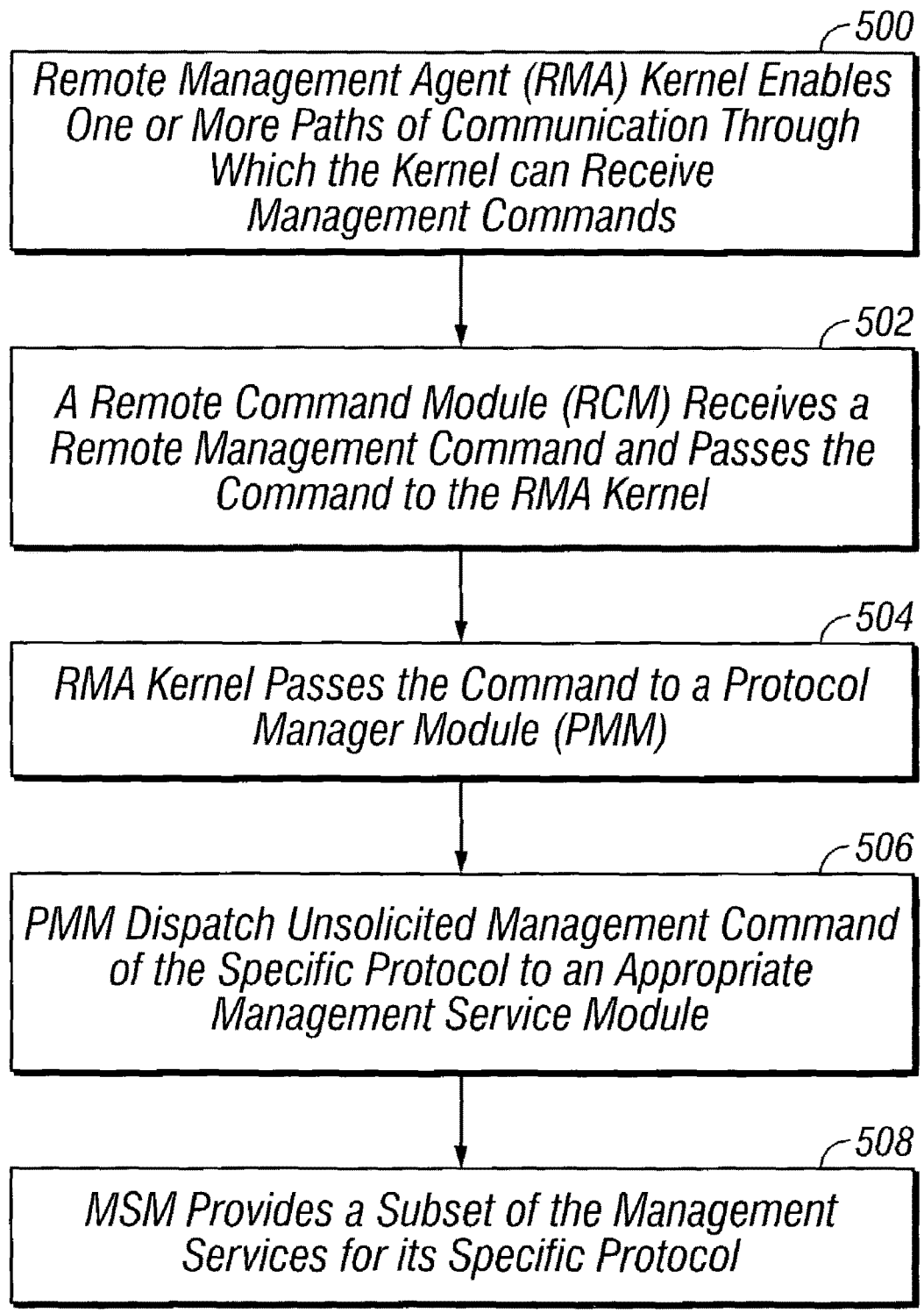
FIG. 5 illustrates a method of using the RMA of FIGS. 4A-4B.

FIG. 5 illustrates a method of using the RMA 104 of FIGS. 4A-4B. In a block 500, upon initialization, the RMA kernel 418 attempts to enable one or more communication paths through which the kernel 418 can receive management commands. Each of these paths support the unsolicited receipt of management commands for a single management protocol, such as in-band Fibre Channel Common Transport (FC-CT), out-of-band IP-Based FC-CT or IP-Based SNMP. Since the RMA 104 supports an arbitrary number of paths on which to receive remote commands, the RMA 104 allows (a) simultaneous handling of multiple management protocols or (b) simultaneous handling of a single management protocol from multiple sources.

Remote Command Modules

The RMA 104 may receive management commands from multiple paths through dynamically loadable remote command modules (RCMs) 410A-410D. Each remote command module 410 may accept unsolicited remote management commands of a single protocol from a single path. A "path" may be an interface to a device driver 400 or a network interface card that uses Fibre Channel, Ethernet, or some other topology as a method of transmission. A "path" may be an interface to another software component, such as a local application. Each registered RCM 410 is operable to interface with the appropriate hardware and/or software to receive remote management commands.

For example, one RCM 410A may receive in-band Fibre Channel Common Transport (FC-CT) management commands via a path 402. A separate RCM 410B may receive out-of-band Internet Protocol (IP) FC-CT management commands. To extend the RMA architecture 104 to non-Fibre Channel products, additional RCMs may support a different management protocol and/or access commands on a different path.

In a block 502, an RCM 410 receives a remote management command and passes the command to the RMA kernel 418. The RMA 104 supports multiple management protocols through the use of multiple dynamically loaded protocol management modules (PMMs) 420A-420C.

In a block 504, the RMA kernel 418 passes the command to a PMM 420. Conceptually, the RMA kernel 418 may be a command dispatcher.

Protocol Managers

One or more PMMs 420A-420C may be loaded to support one or more desired management protocols. Each protocol manager 420 may be a dynamically loadable module that processes commands for a single remote management protocol.

Each protocol manager 420 may provide complete support for a remote command set (with remote commands such as retrieve parameter) of the protocol manager's specific protocol. Alternatively, each protocol manager 120 may provide a routing service to one or more management services 430, which support a subset of the management command set of the protocol.

The protocol manager 120 may also provide a generic-services layer that applies to all commands of a specific protocol before routing the command to a management service 130. Such services may include authentication or data compression.

The FC-CT protocol manager 420A or one of the management services 444 may be responsible for authentication and determine the validity of incoming commands based on content of an extended preamble of a CT header and discard invalid commands. When a CT command is created on the host node 103, authentication data is placed in the extended preamble of the CT_IU that specifies the command. Upon receiving this command, the FC-CT protocol manager 420A or a remote CT server 430 will examine the contents of the extended preamble in order to determine the validity of the authentication data. A command is deemed invalid if the authentication data is deemed invalid. Authentication may be enhanced through the use of a CT Key Server 430C or other security component.

In a block 506, each PMM 420 is responsible for taking an unsolicited management command of the specific protocol and dispatching the command to an appropriate management service 430. A PMM 420 for a relatively simple management protocol might execute the command itself. A PMM 420 for a more complex management protocol may likely act as a second-layer dispatcher that interprets the command based on its knowledge of the underlying protocol and calls one of several management service modules (MSMs) 430A-430D.

For example, a FC-CT Protocol PMM 420A may call a FC-CT FC MSM 430A made by Emulex Corporation of Costa Mesa, Calif. The FC-CT Protocol PMM 420A may also call a directory server 430B, a key server 430C or some other CT server 430D.

Management Services

In a block 508, each MSM 430 would provide a subset of the management services for its specific protocol. For example, an FC-CT protocol management module 420A may dispatch a CT command to one of several CT services 430A-430D based on the GS_Type and GS_Subtype fields (Emulex-specific or according to the FC-GS standard) in the CT command (Emulex-specific or standard). Several management service modules 430 may be desirable, but one embodiment has at least a single FC MSM 430A that services Emulex-specific remote management CT commands. One embodiment implements management services 444 with a FC-GS standard GS_Type and a vendor-unique GS_Subtype. The specific commands in this implementation are vendor unique. Other embodiments may implement a standard FC_GS service using the command set in the specification (such as a key server 430C or a directory server 430B as mentioned below). Other embodiments may implement vendor unique services using additional vendor unique GS_Subtype values.

A directory server MSM 430B may also be implemented in order to support discovery in the absence of a fabric switch. Additional protocol management modules 420 (and perhaps additional management service modules 430) could extend the RMA architecture 104 to non-Fibre Channel products.

RMA Kernel

The RMA kernel 418 may receive unsolicited management commands from the remote command modules 410A-410D and then dispatch these commands to an appropriate protocol manager 420. The RMA kernel 418 may not know the specific manner by which remote commands are received. The implementation details of a specific protocol may not be relevant to the RMA kernel 418.

Instead, the RMA kernel 418 may provide a method for one or more remote command modules 410A-410D to register their ability to route incoming remote commands. The RMA kernel 418 may also provide a method for one or more protocol managers 420A-420C to register their ability to accept remote commands. The RMA kernel 418 should have at least one operational protocol manager 420 that receives remote commands from at least one operational remote command module 410.

Each protocol manager 420 may register with the RMA kernel 418 by providing a callback routine to the RMA kernel 418. The callback routine will be invoked by the RMA kernel 418 when a remote command of the appropriate protocol is received by the driver 400 and passed to the RMA kernel 418. The kernel 418 may provide a routine or function such as:

RMA_RegisterProtocolManager(void* (callback_function) (parameter-list))

A "routine" may be generally defined as a named body of code. A "routine" and "function" may be synonymous as used herein. Callback routines and functions may be generally understood by those of ordinary skill in the software art. The concept of a callback routine is that one body of code (e.g., a client GUI application 302) can request that one of its named functions (the "callback routine") be invoked by another body of code (e.g., the RMA kernel 418) upon the occurrence of some future event (like a device error). In this example, the client GUI application 302 does not have the ability itself to detect a device error, but needs to display a visual indicator of the error. The RMA kernel 418 can detect such an error. Thus, an external body of code (client GUI application 302) "registers" a callback routine with the RMA kernel 418, i.e., the client application 102 passes the address of the callback routine to the RMA kernel 418. When the RMA kernel 418 detects a device error, the RMA kernel 418 uses the address to invoke the callback routine, thus "calling back" to the client application 102. The callback routine concept is used in this area of the RMA kernel 418 to allow protocol managers 420 to register a callback routine that is invoked when the kernel 418 receives a command.

A parameter to the callback routine may provide a pointer to the incoming remote command (the pointer is an address of a memory location that contains the incoming remote command).

Each remote command module 410 may register with the RMA kernel 418 in a similar manner, but the callback roles may be reversed. The RMA kernel 418 provides a callback routine to each registered remote command module 410. The callback routine may be invoked by a RCM 410 each time that RCM 410 receives a remote command via its path. The RMA kernel 418 may provide a function such as:

RMA_RegisterRemoteCommandModule ((void*) RMA_RCMCallback Function( ))

When an RCM 410 receives a remote management command via its path, the RCM 410 calls the RMA_RCMCallbackFunction and passes a pointer to the incoming remote management command (the pointer is an address of a memory location that contains the incoming remote management command). The callback routine passes the command to a dispatch routine 412 of the RMA kernel 418.

The dispatch routine 412 attempts to associate the command with a registered protocol manager 420. If an associated protocol manager 420 is registered with the RMA kernel 418, the dispatch routine 412 will pass the command to the protocol manager 420 via the protocol manager's registered callback routine.

If the dispatch routine 412 is unable to associate a remote command with a registered protocol, then the remote command is discarded.

Each protocol manager 420 may be registered with the RMA kernel 418 via the RMA_RegisterProtocolManager routine, and provides a callback routine_to this RMA_RegisterProtocolManager routine.

GUI Examples

FIG. 6 is a screen shot of one embodiment of an application window 600 ("HBAnywhere Utility") that may be provided by the client 102 at the remote manager 103. The window 600 illustrates a File menu 604, a View menu 606, an Adapter menu 608, a Help menu 610, a rediscover button 612, a reset button 614, a host sort button 614, a fabric sort button 616, a local-HBAs-only button 618 and a help icon 620.

When a user clicks on the rediscover button 612, the client 102 will initiate a discovery process. When a user clicks on the local-HBAs-only button 618, the client 102 restricts discovery to the local host CPU only.

When a user clicks on the reset button 614, the client 102 causes the selected adapter 112 to be reset.

When a user clicks on the host sort button 614, the client 102 causes the elements in the node list 650 to be sorted by host name and displays a "Discovered Elements" sub-window 602. For example, the sub-window 602 in FIG. 6 lists four host servers and six adapters. The left side of the window 600 shows four host icons 620A-620D and six adapters 622A-622F. In this example, the first host server 620A in FIG. 6 and the first two adapters 622A-622B are local, while the other servers 620B-620D and adapters 622C-622F are remote.

FIG. 7 is a screen shot of one embodiment of another application window 700 that may be provided by the client 102 at the remote manager 103. From the window 600 in FIG. 6, if the user clicks on the fabric sort button 616, the client 102 causes the elements in the node list 750 to be sorted by Fabric connection and displays a "Discovered Elements" sub-window 702. In the example of FIG. 7, the sub-window 702 lists one fabric and six adapters. The left side of the window 700 shows six adapters 722A-722F.

FIG. 8 is a screen shot of one embodiment of another application window 800 that may be provided by the client 102 at the remote manager 103. From the window 600 in FIG. 6, if the user clicks on the first server icon 620A, the client 102 displays a "Host Attributes" sub-window 802. The Host Attributes sub-window 802 may, for example, display the name of the host server and the location of firmware and drivers. The Host Attributes sub-window 802 may be modified to display other host server parameters and conditions.

FIG. 9 is a screen shot of one embodiment of another application window 900 that may be provided by the client 102 at the remote manager 103. From the window 600 in FIG. 6, if the user clicks on the first adapter icon 622A, the client 102 displays a "General" information sub-window 902 for the first adapter 622A. The sub-window 902 may list adapter information such as, for example, model type 912, adapter description 914, World Wide Node Name (WWNN or Node WWN) 916, driver version 918, firmware version 920, driver name 922 and link status 924. The "General" information sub-window 902 may be modified to display other adapter parameters and conditions.

FIG. 10 is a screen shot of one embodiment of another application window 1000 that may be provided by the client 102 at the remote manager 103. From the window 900 in FIG. 9, if the user clicks on a "Details" tab 904, the client 102 displays a "Details" information sub-window 1002 for the first adapter 622A. The "Details" information sub-window 1002 may display details such as, for example, Node WWN 1004, Node Symbolic Name 1006, description 1008, driver name 1010, driver version 1012, hardware version 1014, option ROM version 1016, serial number 1018, number of ports 1020, device ID 1022, IEEE address 1024 and Boot BIOS enabled/disabled 1026. The "Details" information sub-window 1002 may be modified to display other adapter details.

FIG. 11 is a screen shot of one embodiment of another application window 1100 that may be provided by the client 102 at the remote manager 103. From the window 900 in FIG. 9, if the user clicks on a "Port Attributes" tab 906, the client 102 displays a "Port Attributes" information sub-window 1102 for the first adapter 622A. The "Port Attributes" information subwindow 1102 may display port attributes such as, for example, Node WWN 1104, Port WWN 1106, Port Symbolic Name 1108, port FC ID 1110, port type 1112, port state 1114, supported class of service 1116, supported FC types 1118, supported speed 1120, current speed 1122, max frame size 1124, operating system device name 1126, discovered ports 1128 and fabric name 1130. The "Port Attributes" information sub-window 1102 may be modified to display other port attributes.

FIG. 12 is a screen shot of one embodiment of another application window 1200 that may be provided by the client 102 at the remote manager 103. From the window 900 in FIG. 9, if the user clicks on a "Port Statistics" tab 908, the client 102 displays a "Port Statistics" information sub-window 1202 for the first adapter 622A. The "Port Statistics" information sub-window 1202 may display statistics such as, for example, transmit frames 1204, transmit words 1206, transmit KB count 1208, transmit sequences 1210, LIP count 1212, error frames 1214, link failures 1216, loss of signal 1218, invalid transmit words 1220, ex count original 1222, receive frames 1224, receive words 1226, receive KB count 1228, receive sequences 1230, NOS count 1232, dumped frames 1234, loss of sync 1236, prim sequence prot errors 1238, invalid CRCs 1240, ex count resp 1242. Data throughput counters and error counters at the port may provide some of this information. The "Port Statistics" information sub-window 1202 may be modified to display other port statistics.

FIG. 13 is a screen shot of one embodiment of another application window 1300 that may be provided by the client 102 at the remote manager 103. From the window 900 in FIG. 9, if the user clicks on a "Firmware" tab 910, the client 102 displays a "Firmware" information sub-window 1302 for the first adapter 622A. The "Firmware" information sub-window 1302 may display a firmware version 1304, a firmware name 1306, an SLI-1 firmware name 1308 and an SLI-2 firmware name 1310. The "firmware" information sub-window 1302 may be modified to display other firmware information.

Firmware Download

FIGS. 13 and 14 show a firmware download process. when the user clicks on a "Browse" button 1312, the client 102 displays a "Select Firmware File" window 1314. The user may select a file from a file selection field 1316 or file list 1318 of the "Select Firmware File" window 1314. The user may click on an Open button 1320 and a download button 1322 to download the selected firmware file to the adapter 622A.

FIG. 14 illustrates the firmware (selected in FIG. 13) download in progress.

In one embodiment, a remote HBA 112 will not begin erasing a flash memory until the intended firmware image file is present on that HBA 112.

One desirable functional feature is that the client 102 and/or agents 104A-104D may maintain a repository of firmware image files, which a system administrator can manage remotely at the remote manager 103. For example, if a particular firmware image file is already present in the remote node's repository, the client 102 can download the firmware remotely without re-transmitting the firmware over the link 100.

FC-RMAPI Information Definitions

Attributes

The client 102 and agent 104 use "attributes" of information associated with a particular piece of hardware of the SAN 50, such as a server 110, an HBA 112 or a port. Examples of attributes include Version ID, WWN, Port State, Invalid CRC Count, and SCSI Bus Number. Each attribute entry may comprise an attribute type (e.g., 2 bytes; server, HBA or port), an attribute length (e.g., 2 bytes; identifies total length of entire attribute entry in bytes) and attribute data value (variable length; 4-256 bytes in one configuration). Fill bytes may be added, as specified in FC-MI for attribute values.

The datum in the attribute may be represented either as a binary number or an ASCII string. If the datum is an ASCII string, the datum should be null-terminated. The representation (binary or ASCII) may be implied by the attribute type code.

Attribute Blocks

An "attribute block" may be formed by concatenating one or more attributes, preceded by a count field specifying the number of attributes in the attribute block. Attribute blocks may be constructed in a somewhat similar manner as the standard Fibre Channel Methodologies for Interconnects (FC-MI) Attributes Block, as defined in the FC-MI specification (attached as Appendix B), but there may be some differences from the standard FC-MI Attribute Blocks. For example, various firmware names may be in attribute blocks that are different from the standard FDMI Attribute Blocks.

Each attribute block may be a fixed-size or variable-sized entity.

Attribute block types may include a server attributes block type, an HBA attributes block type, a port attributes block type, a port statistic block, a port Fibre Channel Protocol (FCP) mappings/bindings attributes block and an FC-3 management attributes block.

Each attribute entry in the block specifies a particular attribute associated with the block. Attribute blocks may contain any or all of their applicable attributes, in any order.

When an application call at the client 102 is made to retrieve an attribute block, the caller should first allocate enough memory at the client 102 to accommodate the request. If the amount of memory allocated is insufficient, an error code will be returned together with the actual size required for the call. When an application encounters this situation, the original memory should be released, a new block allocated using the correct size, and the call re-issued. The maximum block size may be calculated as follows:

The size of the attribute count entry=4

Maximum size of attribute=1+4 (size of Type entry+size of length entry=4)

Maximum size of attribute=2+4 (size of Type entry+size of length entry=4)

Maximum size of attribute=n+4 (size of Type entry+size of length entry=4), where n is the number of entries in the attribute block.

In a more compact form: (4+sum of all attribute sizes+4* number of attributes)

An "attribute table" is a structure containing all attributes for a particular piece of hardware, with each attribute represented as a variable-length field. Attributes may be represented in table format in some of the lower level software modules, but may be represented in block format to application level software.

An attribute list is formed by concatenating one or more attribute blocks, preceded by a count specifying the number of blocks in the list.

FIGS. 16A-16B illustrate examples of server attributes and their formats.

FIGS. 17A-1, 17A-2, 17B-1, and 17B-2 illustrate examples of HBA attributes and their formats. The "Firmware Version" may be identical to the operational firmware version. The number of ports reported for an HBA made by Emulex may be 1. An Emulex dual-channel HBA may appear to the FC-RMAPI 325B as two distinct HBAs 112, each possessing a single port. "OperationalFirmwareName" is an operation firmware on an HBA made by Emulex. "SLI-1 FirmwareName" is an SLI-1 overlay software on an Emulex HBA. "SLI-2FirmwareName" is an SLI-II overlay software on an Emulex HBA. The "IEEEAddress" is an address of an HBA 112. The "BootBiosState" is a current state (enabled/disabled) of the Boot Bios software, if currently present on an HBA 112. The "PlatformName" (also called the Host Name) refers to a GS-4 HBA configuration server.

FIG. 18 illustrates examples of port attributes and their formats.

FIGS. 19A-19B illustrate examples of port statistics and their formats.

FIGS. 20A-20B illustrate examples of port FCP attributes.

FIG. 21 illustrates examples of FC-3 management attributes.

FIGS. 23A-23E illustrate one embodiment of a software resource attribute and its fields.

Appendix A: Fc-Rmapi

Pages 1-5 of Appendix A list data types and structure definitions that may be used by FC-RMAPI functions.

Pages 6-25 of Appendix A provide examples of RMAPI functions/commands, their arguments and their return values.

Appendix B: Fc-Mi

Appendix B is the Fibre Channel Methodologies for Interconnects (FC-MI) Attributes specification Rev 1.8.

CT IUs

Transfer lengths described herein may be in bytes. The total transfer length for all CT Request, Accept, and Reject CT_IUs may be in a multiples of 4 bytes. As defined in the FC-GS Specification, the lengths of the Basic Preamble and the Additional Preamble are a multiple of 4 bytes.

As defined herein, the lengths of all CT Requests' Additional Information fields may be a multiple of 4 bytes. All Attribute Blocks, Statistics Blocks, and other entities that make up the Additional Information fields may be defined to have a length that is a multiple of 4 bytes. For each ASCII parameter, the string may be null-terminated, and additional padding nulls may be added to meet the "4 byte multiple" requirement, if necessary.

Basic Preamble

In the Basic Preamble, all fields and bits not described may be reserved and may be set to 0.

Command (Request CT IU)

Revision Field: a value of 0x02 may be used to indicate compliance with FC-GS-3 revision 7.01.

IN_ID: A value of 0 may be used.

GS_Type: A value of 0x0A may be used to indicate Vendor-Unique (e.g., Emulex) Management Services.

GS_Subtype: A value of 0x10 may be used to indicate the HBA Management Service.

Options Field:

Bit 7: Exchange Mapping: A value of 0 may be used to indicate Synchronous Mode.

Bit 6: Partial Response: A value of 0 may be used to indicate "unspecified."

Bit 5: Extended Preamble Present: A value of 1 may be used to indicate extended CT_IU preamble is present.

Command/Response Code: may be a vendor-unique FC-CT Command Code, as shown in FIGS. 24A-24B. FIGS. 24A-24B illustrate examples of vendor-unique FC-CT Command codes.

Maximum Size In one embodiment, a 16-bit value describing the maximum size (size of allocated response buffer) of the Accept CT_IU. The maximum size may be the total size of the CT_IU, including the Basic Preamble, the Extended Preamble, and the Additional Information. The maximum size may be a multiple of 4 bytes. The IOCTL system may impose a 64 kb maximum transfer length.

Response (Accept CT IU)

All fields may be as described in FC-GS-3 revision 7.01. In addition, there may be a Vendor-Unique Field.

Extended Preamble

Authenticated CT may be used to implement a level of security. This may imply the use of the extended CT_IU preamble.

Request CT IU

The CT Command (FIGS. 15A-1 and 15A-2 and 24A and B) may be carried in the Request CT_IU Additional Information field. For the purpose of describing CT Commands, this field may be further divided into two parts: the Command Block and the Command Data Field. Command Blocks may be designed according to the following principles:

Command Blocks may be between 1 and 8 words in length.

Command Block elements may be aligned on longword boundaries. An exception may be HBA Identifiers and Port Identifiers, which are aligned at 8-word boundaries.

All Command Blocks may contain a Vendor_OUI (IEEE Organizationally Unique Identifier) in the first word (word 0). The OUI assigned to Emulex is 0x000000C9.

Some commands may not use parameters. These commands may use the 1-word Nominal Command Block form, which contains only the Vendor_OUI.

Some commands may use a control word called the Command Control Word (CCW). When present, the Command Control Word is in word 1.

Some commands may require an additional word for control parameters, which is called the Command-Specific Parameter. When present, the Command-Specific Parameter is in word 2.

Some commands may send a variable length block of data to the server in a field called the Command Data Field. All Command Data Field structures may be self-identifying as to Type, Length, and Count. Therefore, no data length parameter is necessary in the Command Block.

Certain commands may use a set of Port Identifiers. These parameters may be 8 bytes in length each. To keep them aligned to 8-byte boundaries, the appropriate Command Blocks may be padded with reserved words, as necessary. The Port Identifiers are contained in words 2-5 in some commands, and in words 4-7 in others.

FIGS. 25-27 illustrate examples of Common Transport (CT) Command Block formats.

Proxy/Object Port (or HBA) Identifiers

There may be times when it is not possible for the client 102 to send a request to a desired HBA 112. In such situations, the client 102 may be able to use a proxy port (or HBA) as the recipient of the CT request. The client 102 may know the WWPN of a proxy port (or HBA) to receive and execute the request on behalf of the caller. To convey this information, the request may contain two parameters: the "Proxy Port Identifier" and the "Object Port Identifier" (or "Proxy HBA Identifier" and the "Object HBA Identifier").

However, some requests, such as "Get Server Attributes" and "Set Server Attributes," do not need two identifiers. For these commands, only the Object Port Identifier (or Object HBA Identifier) needs to be contained in the request.

For those commands that do contain the two identifiers, the client 102 will generally send the request to the desired Object Port (or Object HBA) and set the Proxy Port Identifier (or Proxy HBA Identifier) to 0. However, if the client 102 chooses to send the request to a proxy port (or HBA), the client 102 will provide a valid non-zero Proxy Port Identifier (or Proxy HBA Identifier).

In the Request CT_IU, each Port Identifier (or HBA Identifier), when present, may be the eight-byte WWPN.

Client/Server HBA Identifiers

For the file transfer protocol, some mechanism may be used to tag individual Requests. In the Request CT_IU, each HBA Identifier, when present, may be the eight-byte WWPN.

Accept CT IU

If the server 110 is able to successfully complete a CT Request, the server 110 sends an Accept CT_IU, in response, to the client 102. The response data may be carried in the Accept CT_IU Additional Information field. For the purpose of describing CT Accepts, this field may be further divided into two parts: the Response Block and the Response Data Field. CT Accept blocks may be designed according to the following principles:

Response Blocks may be between 1 and 8 words in length.

No elements may be aligned at better than longword boundaries.

Response Blocks may not mirror their corresponding Command Blocks.

All Response Blocks may contain a Vendor_OUI in the first word (word 0).

The Nominal Response Block may comprise solely of the Vendor_OUI.

Reject CT IU

Standard Reject Codes

If the server 110 is unable to perform a requested operation, the server 110 sends a Reject CT_IU to the client 102. All standard FC-GS-3 Reason Codes may be supported. Most of these Reason Codes are used for protocol or physical errors, such as Logical Error, Invalid CT_IU Size, Logical Busy, and Protocol Error. Other Reason Codes include:

Code Description of Reason Code
0x01 Invalid Command Code
Returned if the Command Code is not a valid vendor-unique management command.
0x09 Unable to Perform Command Request
Returned if there is an error processing a supported Command Code. The Explanation field is as follows:
Code Description of Reason Code Explanation
0x00 No Additional Explanation
0x10 Invalid HBA Identifier
0x11 HBA Attribute Block Contains Multiple Attributes of the Same Type
0x12 Invalid HBA Attribute Block Length
0x13 Invalid HBA Attribute
0x20 Invalid Port Identifier
0x21 Port Attribute Block Contains Multiple Attributes of the Same Type
0x22 Invalid Port Attribute Block Length
0x23 Invalid Port Attribute
0x30 Invalid Host Identifier
0x31 Server Attribute Block Contains Multiple Attributes of the Same Type
0x32 Invalid Server Attribute Block Length
0x33 Invalid Server Attribute
0x0B Command Not Supported
Vendor-Unique Resect Codes If the server 110 generates one of the vendor-unique reject codes described herein, the server 110 shall set the Reason Code to 0xFF, meaning Vendor-Unique Error; the Reason Code Explanation to 0, meaning No Additional Explanation; and the Vendor Unique field to the appropriate value.

FIGS. 28A-28B list examples of CT Vendor-Unique Reject Reason Codes.

It is possible for all remote CT Operations to fail due to a hardware error on either the local HBA 103 or the remote HBA 110. In addition, certain commands have other command-specific error codes.

FIGS. 29A-29C list examples of CT vendor-unique reason codes for command-specific errors.

Mailbox Error Status

There may be cases where a mailbox (MBX) Command fails on the server 110 and is well known to the client 102, and the MBX Response is needed. One example is the Run HBA Diagnostic Command, with the RUN_BIU_DIAG sub-code. In these cases, the Reject Reason Code may be MBX_ERR. The actual MBX Response data may be placed in the Reject Additional Information field.

There may be other cases in which the server 110 can evaluate the MBX error, and return to the client 102 a status (Reject Reason Code) that is isolated from the underlying MBX command. The Reject Reason Code may give the client 102 sufficient information. Examples include the numerous MBX error codes possible for the flash programming operations. The client 102 may not care, for example, if the MBX Command was LOAD_SM or DOWNLOAD, or if the MBX Status was Erase Flash Failure or Program Flash Failure. The Reject Reason Code is FLASH_ERROR. However, in such a case, the actual MBX Response data may also be placed in the Reject Additional Information field, according to the format defined below. The full details of the error are available to the client 102, in case the Application or System Administrator needs the details.

Reject Additional Information

Certain Vendor-Unique Reject Codes may require the Reject Additional Information Field to return more information to the client 102.

FIG. 30 illustrates one embodiment of the CT Reject Additional Information Field. The Additional Information Type field uniquely identifies Reject Additional Information types.

Type Description
0x0001 Mailbox Response
others Reserved

The Additional Information Field Length field indicates the total length in bytes of the Additional Information Field. The total length may be a multiple of 4 bytes and includes the Type, Length, and Data fields.

The Data Field contains the additional information payload. The Data Field may be at least 4 bytes in length and the length may be a multiple of 4. The maximum length may be 256 bytes. Fill bytes may be added if necessary.

Reject Additional Information: Mailbox Response

When a MBX Command fails on a remote server 110, the MBX Response is placed in the Reject CT_IU Additional Information field, as shown in FIG. 31.

Additional Information Type: 0x0001

The Additional Information Field Length field indicates the total length in bytes of the Additional Information Field. The total length may be a multiple of 4 bytes and includes the Type, Length, and Data fields.

The Data Field contains the MBX Response.

Port Statistics

FDMI does not address the retrieval of port statistics. The FC RMAPI 325B may have a vendor-unique method for handling port statistics.

From the client's perspective, there may be only two operations applicable to port statistics: retrieval and reset. A specific FC-CT Command is provided to reset statistics: Reset Port Statistics (RPST).

For retrieval, it is convenient to handle port statistics much like attributes. The following description outlines the data structures applicable to port statistics.

FIG. 32 illustrates one embodiment of a general format that may be used for all port statistics.

A Port Statistic Entry Type field uniquely identifies each individual statistic.

A Port Statistic Entry Length field indicates the total length in bytes of the Port Statistic Entry. The total length may be a multiple of 4 and includes the Type, Length, and Value fields.

A Port Statistic Entry Value field specifies the statistic value. Statistic Values may be Binary Type, and may be either 4 or 8 bytes in length.

FIG. 33 illustrates one embodiment of a Port Statistics Block entry. The Port Statistics Block may be a fixed or variable-sized entity, which may be constructed similarly to the Port Attributes Block. The Port Statistics Block may contain any or all of the following statistics, in any order.

A Number of Port Statistic Entries field specifies the number of Port Statistic Entries contained in the block. A value of 0 is valid and shall indicate that no Port Statistic Entries are contained in the block. In this case, the length of the block shall be 4 bytes.

Each Port Statistic Entry specifies a particular statistic associated with the block. Each Port Statistic Entry follows the general Port Statistic Entry format specified in FIG. 32.

Software Resource Descriptor (SRD)

Several CT Command types may manipulate software resources (files) on remote servers 110. For example, Send_Software_Resource sends a file from the client 102 to a server 110. Rename_Software_Resource changes the name of an existing file on a remote server 110. Get_Remote_Resource_List retrieves descriptors of all the resources available on a remote server 110.

Different CT Commands operate on different numbers of software resources. Using the same three examples, Send_Software_Resource may operate on exactly one file, Rename_Software_Resource may operate on exactly one file but requires two descriptors, and Get_Remote_Resource_List retrieves descriptors for a variable number of resources. These considerations indicate a Software Resource Descriptor design similar to that used for Attributes.

FIG. 34 illustrates one embodiment of a Software Resource Descriptor (SRD). An SRD Type field identifies the type of SRD. A SRD Length field indicates the total length in bytes of the SRD, including all five fields. A Software Resource Attribute field contains the Software Resource Attribute, which contains bit masks that qualify the resource. A Software Resource version field contains the Software Resource Version, which is a null-terminated ASCII string, and may be padded if necessary to a length of 20 bytes. A Software Resource Name field contains the Software Resource Name. The Software Resource Name field may be a null-terminated ASCII string, with a maximum size of 256 bytes.

FIG. 35 illustrates one embodiment of a Software Resource Block (SRB). A Number of SRDs field specifies the number of SRDs contained in the SRB. A value of 0 may be illegal and may be considered to be an error. The maximum number is variable and may be limited by the implementation. No limit is imposed by this specification.

SRD n: Each SRD may describe exactly one Software Resource.

The Software Resource Attribute may be a 64-bit field that identifies software and hardware types of a resource or resources. When used to describe a specific resource, the Software Resource Attribute is part of the resource's Software Resource Block (SRB). The Software Resource Attribute appears in this context in several CT Commands, such as Send_Software_Resouce and Delete_Remote_Resource.

When used to describe a set of resources, the Software Resource Attribute appears as a parameter in the CT Command itself, as in Get_Remote_Resource_List.

Command (Request) and Response (Accept) Details

In the command and response blocks described below, the Additional Information field is shown, and the Basic Preamble and Extended Preamble are not shown. The terms "Command" and "Response" are used here to mean the Request CT_IU Additional Information field, and the Accept CT_IU Additional Information field. For error responses, a Reject CT_IU is returned, rather than an Accept CT_IU.

Also, all Command and Response Blocks contain a Vendor_OUI (IEEE Organizationally Unique Identifier) in the first word (word 0). In this section, the Vendor OUI is shown in the Command and Response Blocks.

Get Attributes Commands

Get Server Attributes (GSAT)

FIGS. 36A-36B illustrate examples of a Get Server Attributes Command and a Get Server Attributes Response. The Get Server Attributes command instructs the server 110 to return its Server Attributes Block (FIGS. 16A-16B) to the client 102. The GSAT command may not be HBA- or port-specific, so the GSAT command may not need proxy identifiers.

The GSAT command may not require parameters; the Command comprises the Nominal Command Block.

The GSAT response may comprise a Nominal Response Block followed by the Server Attribute Block. Generally, but not necessarily, the returned block will contain all the applicable attributes.

Get HBA Attributes (GHAT)

FIGS. 37A-37B illustrate examples of a Get HBA Attributes Command and a Get HBA Attributes Response. The Get HBA Attributes command instructs the server 110 to return the Object HBA's HBA Attribute Block (see FIGS. 17A-1, 17A-2, 17B-1, and 17B-2) to the client 102.

The GHAT command may be HBA-specific, so the GHAT command may contain the Object HBA Identifier and the Proxy HBA Identifier. The GHAT command contains two parameters: the Object HBA Identifier, and the Proxy HBA Identifier.

The GHAT response comprises the Nominal Response Block followed by the HBA Attribute Block. Generally, but not necessarily, the returned block will contain all the applicable attributes.

Get Port Attributes (GPAT)

FIGS. 38A-38B illustrate examples of a Get Port Attributes Command and a Get Port Attributes Response.

The Get Port Attributes command instructs the Object Server 110 to return the Object Port's Port Attribute Block (see FIG. 18) to the client 102.

The GPAT command may be Port-specific, so the GPAT command contains the Object Port Identifier and the Proxy Port Identifier. The GPAT command contains two parameters: the Object Port Identifier, and the Proxy Port Identifier.

The GPAT response comprises the Nominal Response Block followed by the Port Attribute Block. Generally, but not necessarily, the returned block will contain all the applicable attributes.

Get Driver Attributes (GDAT)

FIGS. 39A-39B illustrate examples of a Get Driver Attributes Command and a Get Driver Attributes Response. The Get Driver Attributes command instructs the Object Server 110 to return a Driver Attribute Block (not shown) to the client 112. The GDAT command may not be HBA- or port-specific, so the GDAT command needs no proxy identifiers. The GDAT command may not require parameters; the Request may comprise the Nominal Command Block.

The GDAT response comprises the Nominal Response Block followed by a Driver Attribute Block. Generally, but not necessarily, the returned block will contain all the applicable attributes.

Get Port Statistics (GPST)

FIGS. 40A-40B illustrate examples of a Get Port Statistics Command and a Get Port Statistics Response. The Get Port Statistics command instructs the Object Server 110 to return the Object Port's Port Statistics Block to the client 102. The GPST command may be port specific, so the GPST command may contain the Object Port Identifier and the Proxy Port Identifier. The GPST command may contain two parameters: the Object Port Identifier, and the Proxy Port Identifier.

The GPST response may comprise the Nominal Response Block followed by the Port Statistics Block. Generally, but not necessarily, the returned block will contain all the applicable statistics.

Set Server Attributes (SSAT)

FIGS. 41A-41B illustrate examples of a Set Server Attributes Command and a Set Server Attributes Response. The Set Server Attributes command instructs the Object Server 110 to register the attributes contained in the Server Attributes Block. The SSAT command may not be HBA- or port-specific, so the SSAT command may not need proxy identifiers.

The SSAT command contains a Server Attributes Block, which specifies the attribute(s) to register. One or more attributes may be specified in the attributes block, and registered with a single command. Zero attributes in the block may be an error.

The SSAT response comprises of the Nominal Response Block.

Set HBA Attributes (SHAT)

FIGS. 42A-42B illustrate examples of a Set HBA Attributes Command and a Set HBA Attributes Response. The Set HBA Attributes command instructs the Object Server 110 to register the attributes contained in the HBA Attributes Block.

The SHAT command may be HBA-specific, so the SHAT command contains the Object HBA Identifier and the Proxy HBA Identifier. The SHAT command contains an HBA Attributes Block, which specifies the attribute(s) to register. One or more attributes may be specified in the attribute block, and registered with a single command. Zero attributes in the block may be an error.

The SHAT response comprises the Nominal Response Block.

Set Port Attributes (SPAT)

FIGS. 43A-43B illustrate examples of a Set Port Attributes Command and a Set Port Attributes Response. The Set Port Attributes command instructs the Object Server 110 to register the attributes contained in the Port Attributes Block. The SPAT command may be port-specific, so the SPAT command contains the Object Port Identifier and the Proxy Port Identifier. The SPAT command contains a Port Attributes Block, which specifies the attribute(s) to register. One or more attributes may be specified in the attribute block, and registered with a single command. Zero attributes in the block may be an error.

The SPAT response comprises the Nominal Response Block.

Set Driver Attributes (SDAT)

FIGS. 44A-44B illustrate examples of a Set Driver Attributes Command and a Set Driver Attributes Response. The Set Driver Attributes command instructs the Object Server 110 to register the attributes contained in the Driver Attributes Block. The SDAT command may not be HBA- or port-specific, so the SDAT command may not need proxy identifiers. The SDAT command contains a Driver Attributes Block, which specifies the attribute(s) to register. One or more attributes may be specified in the attribute block, and registered with a single command. Zero attributes in the block may be an error.

The SDAT response may comprise the Nominal Response Block.

Reset Port Statistics (RPST)

FIGS. 45A-45B illustrate examples of a Reset Port Statistics Command and a Reset Port Statistics Response. The Reset Port Statistics command instructs the Object Server 110 to re-initialize the Object Port's statistics. The RPST command may be port-specific, so the RPST command may contain the Object Port Identifier and the Proxy Port Identifier. The RPST command contains two parameters: the Object Port Identifier, and the Proxy Port Identifier.

The RPST response may comprise the Nominal Response Block.

Verify Firmware (VFW)

FIGS. 46A-46B illustrate examples of a Verify Firmware Command and a Verify Firmware Response. The Verify Firmware command instructs the Object Server 110 to verify that the specified firmware image resource exists, that the firmware image resource is a correct type for the specified HBA, and that the firmware image resource has a valid internal format.

The VFW command may be an HBA-specific, so the VFW command contains the Object HBA Identifier and the Proxy HBA Identifier. The VFW command may contain the following parameters: Object HBA Identifier, Proxy HBA Identifier, and the remote firmware resource SRD.

The VFW response comprises the Nominal Response Block. Error conditions are reported with a Reject CT_IU.

Download Firmware (DFW)

FIGS. 47A-47B illustrate examples of a Download Firmware Command and a Download Firmware Response. The Download Firmware command instructs the Object Server 110 to download the specified firmware image resource into the specified HBA 112. The DFW command may be HBA-specific, so the DFW command contains the Object HBA Identifier and the Proxy HBA Identifier. The DFW command contains the following parameters: Command Control Word, Object HBA Identifier, Proxy HBA Identifier, and the remote firmware resource SRD.

The DFW response comprises the Nominal Response Block. Error conditions are reported with a Reject CT_IU.

In the Download Firmware (DFW) Command, a description of Word 1, Bit (0) may be (Command Control Word) Reset After Download. Specifically, after the successful download, the port may be reset in Normal mode, and the driver re-initializes.

Upgrade Firmware (UFW)

FIGS. 48A-48B illustrate examples of an Upgrade Firmware Command and an Upgrade Firmware Response. The Upgrade Firmware command provides a single-command mechanism for a client application 102 to cause a firmware image resource on a specific server 103 or 110 to be downloaded into a specific HBA 112 on a (potentially different) specific server 110.

The two servers are not necessarily the same server. The Upgrade Firmware command is transmitted by the client application 102 to the server 103 or 110 containing the necessary firmware image resource. This server 103 or 110 is called the Resource Server. The Resource Server 103 or 110 then transmits the resource, via the Send Software Resource command, to the server 110 containing the HBA 112 to be upgraded. This server 110 is called the Object Server. Finally, the Resource Server 103 or 110 transmits a Download Firmware Command to the Object Server 110.

If the Resource Server 103 or 110 and the Object Server 110 are the same server, the additional steps outlined above are skipped. In this case the Upgrade Firmware command acts like a Download Firmware command.

Since the underlying DFW command may be HBA-specific, and uses the Object HBA Identifier and the Proxy HBA Identifier, these two identifiers are required in the UFW Command. Since the UFW Command itself is not HBA-specific, UFW Command does not require a proxy. Therefore the UFW Command contains three HBA Identifiers: the Resource Server HBA Identifier, the Object Server Object HBA Identifier, and the Object Server Proxy HBA Identifier.

In addition, the UFW command may contain the Command Control Word and the firmware resource SRD.

The UFW response comprises the Nominal Response Block. Error conditions are reported with a Reject CT_IU.

For the Download Firmware (DFW) Command, Word 1, Bit (0) may have a (Command Control Word) Reset After Download. After the successful download, the port is reset in Normal mode, and the driver re-initialized.

Reset HBA (RES)

FIGS. 49A, 49B, 49C-1, and 49C-2 illustrate examples of a Reset HBA Command, a Reset HBA Response and Reset HBA Command details. The Reset HBA command instructs the Object Server 110 to perform the indicated reset action on the specified HBA 112. The RES command may be HBA-specific, so the RES command contains the Object HBA Identifier and the Proxy HBA Identifier. The RES command contains the following parameters: Command Control Word, Object HBA Identifier, and Proxy HBA Identifier.

The RES response comprises the Nominal Response Block. Error conditions are reported with a Reject CT_IU.

Run HBA Diagnostic (RHD)

FIGS. 50A-50C illustrate examples of a Run HBA Diagnostic Command, a Run HBA Diagnostic Response and Run HBA Diagnostic command details. The Run HBA Diagnostic command instructs the Object Server 110 to perform the indicated diagnostic on the Object HBA 112. The RHD command may be HBA-specific, so the RHD command contains the Object HBA Identifier and the Proxy HBA Identifier. The RHD command contains the following parameters: the Command Control Word, the Object HBA Identifier, and the Proxy HBA Identifier.

The RHD response comprises the Nominal Response Block. Error conditions are reported with a Reject CT_IU.

Get Remote Resource List (GRRL)

FIGS. 51A, 51B, 51C-1, 51C-2, and 51C-3 illustrate examples of a Get Remote Resource List Command, a Get Remote Resource List Response and Get Remote Resource List command details. The Get Remote Resource List Command is used to return the Software Resource Descriptors (SRD) for all remote resources that match the specifications in the command. The GRRL command may not be HBA- or port-specific, so the GRRL command may not need proxy identifiers. The GRRL command contains two parameters: the Command Control Word and the Software Resource Attribute.

The GRRL response comprises the Nominal Response Block followed by the variable-length SRD List.

Get Remote Resource Info (GRRI)

FIGS. 52A-52B illustrate examples of a Get Remote Resource Info Command and a Get Remote Resource Info Response. The Get Remote Resource Info Command is used to return the Software Resource Descriptor (SRD) for the resource named in the command. The GRRI command may not be HBA- or port-specific, so the GRRI command may not need proxy identifiers.

In one configuration, the GRRI command contains one SRD. This SRD may be incomplete, containing only a Software Resource Name, or complete, containing both a Name and a Type. If the SRD is incomplete, the server 110 searches for a resource matching the name only. If the SRD is complete, the server 110 searches for a resource matching both the Name and the Type. In either case, if a matching Resource is found, its complete SRD is returned.

The GRRI response comprises the Nominal Response Block followed by the variable-length SRD.

Send Software Resource (SSR)

FIGS. 53A, 53B, 53C-1, and 53C-2 illustrate examples of a Send Software Resource Command, a Send Software Resource Response and Send Software Resource Command Details. The Send Software Resource Command is used to copy a software resource (file) from a client system 103 to a server system 110. The SSR command may not be HBA- or port-specific, so the SRR command may not need proxy identifiers.

The destination resource filename is specified in the CT Request. It is contained in the Software Resource Descriptor (SRD) contained in the SSR Data Field. The destination resource pathname is specified with the appropriate Server Attribute, and may not be included in the CT Request.

The SendMgmtCommand system may have a maximum I/O size, currently expected to be 64 Kb. Firmware files are much larger than this. Thus, the client 102 may fragment the file and send it in pieces, and the server 110 may reassemble the file. This task may be simplified somewhat if only Synchronous Mode CT is used, but the client 102 and agent 104 may also implement a simple fragment-level protocol.

Some mechanism may tag individual SSR Requests, so a server 110 can handle more than one client 102 sending more than one file to the server 110 at the same time. The client and server HBA Identifiers will be included in the SSR Request as part of this mechanism.

Completing this mechanism are a File Transfer Tag and a Fragment Number. These parameters are contained in the Command-Specific Parameter word in the Command Block.

The SSR command may also make use of the command-specific Command Control Word. A control bit in the CCW indicates whether the SSR Data Field contains an SRD or a resource fragment. Two implications result from this design. First, any particular SSR Request transmits either an SRD, or a Resource Fragment, but not both. Second, a minimum of two SSR Requests is required to transmit a software resource: one to transmit the SRD, and at least one to transmit Resource Fragments.

The SSR response comprises the Nominal Response Block.

Delete Remote Resource (DRR)

FIGS. 54A-54C illustrate examples of a Delete Remote Resource Command, a Delete Remote Resource Response and Delete Remote Resource Command Details. The Delete Remote Resource Command is used to remove a software resource (file) from a remote server 110. The DRR command may not be HBA- or port-specific, so the DRR command may not needs proxy identifiers.

The resource filename is specified in the CT Request. The resource filename is contained in the Software Resource Descriptor (SRD) contained in the DRR Data Field. For this command, it is recommended that the SRD contain a null Software Resource Attribute field. In any case, the SPA field is ignored.

The resource pathname is specified with the appropriate Server Attribute, and is not included in the CT Request.

The DRR response comprises the Nominal Response Block.

Rename Remote Resource (RRR)

FIGS. 55A-55C illustrate examples of a Rename Remote Resource Command, a Rename Remote Resource Response and Rename Remote Resource Command Details. The Rename Remote Resource Command is used to rename a software resource (file) on a remote server 110. The RRR command may not be HBA- or port-specific, so the RRR command may not need proxy identifiers.

The current and new resource filenames are specified in the CT Request. They are contained in the two Software Resource Descriptors (SRD) contained in the RRR Request. For this command, it is recommended that each SRD contain a null Software Resource Attribute field. In any case, each SPA field is ignored.

The RRR response comprises the Nominal Response Block.

Test Transmit And Receive (TEST)

FIGS. 56A and 56B illustrate examples of a Test Transmit and Receive Command and a Test Transmit and Receive Response. The Test command provides a mechanism to test the remote management command/response system and the data path.

In addition to the Vendor_OUI, the Test command block comprises the requested CT Command Byte Count, the requested CT Response Byte Count, the Test Command Reference Number, and a Data Field. When the Command is processed by the server 110, the server 110 builds and transmits a response that contains the complemented data field. Note that the Command Byte Count and the Response Byte Count are not required to be equal. When the Response is processed by the client application 102, the data field can be checked for data integrity.

Query HBA (QHBA)

FIGS. 57A-1, 57A-2, 57B, and 57C illustrate examples of Query HBA Response details, a Query HBA Command and a Query HBA Response. The Query HBA Command may be used for two purposes. First, the Query HBA command may be used to determine if a remote HBA 112 is manageable, i.e., if the HBA 112 is installed in a server 110 that is running a remote management agent 104 and/or client 102. Second, Query HBA command may be used to determine the status of a Download Firmware or Reset HBA Command.

The QHBA command may be HBA-specific, so it contains the Object HBA Identifier and the Proxy HBA Identifier. The QHBA command may not require parameters. The Request may comprise the Nominal Command Block.

The QHBA response comprises the Nominal Response Block, followed by the Status Word.

For determining if a remote HBA 112 is manageable, the Status Word may not be applicable. The presence or absence of the response is applicable as follows: if the response arrives within the time-out period, the remote HBA 112 is manageable; if no response arrives within the time-out period, the remote HBA 112 is not manageable.

For checking the status of a Download Firmware or Reset HBA

Command, the Status Word is defined as follows. The "Complete" Bits implies success. If there is an error on the operation, the Query Command will get a Reject, not an Accept.

A number of embodiments have been described. Nevertheless, it will be understood that various modifications may be made. For example, there may be more than one remote manager 103 in the SAN 50. Accordingly, other embodiments are within the scope of the following claims.

What is claimed is:

1. A method comprising:
receiving, at a host bus adapter of a host server, a file for the host bus adapter;
passing, by the host bus adapter, the file to a repository of the host server;
copying the file to the repository, wherein copying the file includes transforming a file name of the file into a format accepted by a plurality of operating system platforms;
after the file has been copied into the repository, receiving a remote manager command from a remote manager; and
after receiving the remote manager command, performing a device-specific action by installing the file for the host bus adapter;
wherein the file is a host bus adapter driver or a firmware file,
wherein the host bus adapter is coupled to a storage area network, and
wherein the file is received at the repository in the host server through in-band communications through the storage area network.

2. The method of claim 1,
wherein the received file is sent from the remote manager to the host server,
wherein the device-specific action is performed only in response to the remote manager command sent from the remote manager to the host server, and
wherein the file and the remote manager command are sent from the remote manager to the host server through network communications.

3. The method of claim 1, wherein the file is a firmware file that is confirmed to be compatible with the host bus adapter by the host server based on a checksum of the firmware file or based on whether the type of the firmware file matches the type of the host bus adapter.

4. A method comprising:
sending a file for a host bus adapter from a first repository in a remote manager to the host bus adapter, the host bus adapter being in a host server;
passing, by the host bus adapter, the file to a second repository in the host server;

causing the file for the host bus adapter to be copied into the second repository, wherein causing the file to be copied includes transforming a file name of the file into a format accepted by a plurality of operating system platforms; and after the file for the host bus adapter has been copied into the second repository, sending a remote manager command from the remote manager to the host server, the remote manager command directing the host server to perform a device-specific action by installing the file for the host bus adapter;

wherein the file is a host bus adapter driver or a firmware file, wherein the file and the remote manager command are sent from the remote manager to the host server through network communications.

5. The method of claim 4, wherein the host bus adapter is coupled to a storage area network, and wherein the file and the remote manager command are sent from the remote manager to the host server through in-band network communications through the storage area network.

6. The method of claim 4, wherein the file is a firmware file that is compatible with the host bus adapter based on a checksum of the firmware file.

7. The method of claim 4, wherein the file is a firmware file that is compatible with the host bus adapter based on whether the type of the firmware file matches the type of the host bus adapter.

8. A method comprising:

sending a file for a host bus adapter from a first repository in a remote manager to the host bus adapter, the host bus adapter being in a host server;

passing, by the host bus adapter, the file to a second repository in the host server;

copying the file to the second repository;

receiving confirmation that the file for the host bus adapter has been copied into the second repository of the host server, sending a remote manager command from the remote manager to the host server, the remote manager command directing the host server to perform a device-specific action, wherein the copied file has a file name that has been transformed into a format accepted by a plurality of operating system platforms; and performing the device-specific action by installing the file for the host bus adapter from the copy of the file stored in the second repository;

wherein the file is a host bus adapter driver or a firmware file, wherein the host bus adapter is coupled to a storage area network, and wherein the file and the remote manager command are sent from the remote manager to the host server through in-band communications through the storage area network.

9. An apparatus comprising:

a host server comprising:

a host bus adapter; and a repository, wherein the host server is configured for:

receiving, at the host bust adapter, a file for the host bus adapter;

passing, by the host bus adapter, the file to the repository;

copying the file to the repository, wherein copying the file includes transforming a file name of the file into a format accepted by a plurality of operating system platforms;

receiving a remote manager command prior to performing a further action with the file for the host bus adapter; and performing a device-specific action by installing the file for the host bus adapter only in response to receiving the remote manager command;

wherein the file is a host bus adapter driver or a firmware file, wherein the host bus adapter is coupled to a storage area network, and wherein the file is received at the repository in the host server through in-band communications through the storage area network.

10. The apparatus of claim 9, wherein the received file is sent from a remote manager to the host server, wherein the device-specific action is performed in response to the remote manager command sent from the remote manager to the host server, and wherein the file and the remote manager command are sent from the remote manager to the host server through network communications.

11. The apparatus of claim 9, wherein the file is a firmware file that is compatible with the host bus adapter based on a checksum of the firmware file or based on whether the type of the firmware file matches the type of the host bus adapter.

12. A storage area network comprising the apparatus of claim 9.

13. An apparatus comprising:

a remote manager comprising:

a first repository;

wherein the remote manager is configured for:

sending a file for a host bus adapter from the first repository to a second repository through the host bus adapter, the host bus adapter being in a host server;

receiving confirmation that the host server copied the file for the host bus adapter into the second repository, wherein the copied file has a file name that has been transformed into a format accepted by a plurality of operating system platforms; and after the host server has copied the file for the host bus adapter into the second repository, sending a remote manager command to the host server, the remote manager command directing the host server to perform a device-specific action by installing the file for the host bus adapter from the copy of the file stored in the second repository;

wherein the file is a host bus adapter driver or a firmware file, wherein the file and the remote manager command are sent from the remote manager to the host server through network communications.

14. The apparatus of claim 13, wherein the host bus adapter is coupled to a storage area network, and wherein the file and the remote manager command are sent from the remote manager to the host server through in-band network communications through the storage area network.

15. The apparatus of claim 13, wherein the file is a firmware file that is confirmed to be compatible with the host bus adapter by the host server based on a checksum of the firmware file or based on whether the type of the firmware file matches the type of the host bus adapter.

16. A storage area network comprising the apparatus of claim 13.

17. A system comprising:
a remote manager comprising:
a first repository; and
a host server comprising:
a host bus adapter; and
a second repository;
wherein the remote manager is configured for:
sending a file for the host bus adapter from the first repository to the second repository through the host bus adapter of the host server; and
sending a remote manager command to the host server after the file for the host bus adapter has been copied into the second repository, the remote manger command directing the host server to perform a device-specific action;
wherein the host server is configured for:
receiving and copying the file for the host bus adapter at the second repository in the host server, wherein copying the file includes transforming a file name of the file into a format accepted by a plurality of operating system platforms; and
performing the device-specific action by installing the file for the host bus adapter;
wherein the file is a host bus adapter driver or a firmware file,
wherein the host bus adapter is coupled to a storage area network, and
wherein the file and the command are sent from the remote manager to the host server through in-band communications through the storage area network.

18. The system of claim 17, wherein the file is a firmware file that is compatible with the host bus adapter based on a checksum of the firmware file or based on whether the type of the firmware file matches the type of the host bus adapter.

19. A storage area network comprising the system of claim 18.

* * * * *